US012663290B2

(12) United States Patent
Akbarzadeh et al.

(10) Patent No.: US 12,663,290 B2
(45) Date of Patent: Jun. 23, 2026

(54) MAP HEALTH MONITORING FOR AUTONOMOUS SYSTEMS AND APPLICATIONS

(71) Applicant: NVIDIA Corporation, Santa Clara, CA (US)

(72) Inventors: Amir Akbarzadeh, San Jose, CA (US); Ruchi Bhargava, Redmond, WA (US); Vaibhav Thukral, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 589 days.

(21) Appl. No.: 17/726,416

(22) Filed: Apr. 21, 2022

(65) Prior Publication Data

US 2022/0341750 A1 Oct. 27, 2022

Related U.S. Application Data

(60) Provisional application No. 63/177,813, filed on Apr. 21, 2021.

(51) Int. Cl.
| | |
|---|---|
| *G01C 21/00* | (2006.01) |
| *G06V 20/56* | (2022.01) |
| *B60W 60/00* | (2020.01) |

(52) U.S. Cl.
CPC ..... *G01C 21/3841* (2020.08); *G01C 21/3878* (2020.08); *G06V 20/588* (2022.01); *B60W 60/001* (2020.02); *B60W 2556/40* (2020.02)

(58) Field of Classification Search
CPC ............ G01C 21/3841; G01C 21/3878; G06V 20/588; B60W 60/001; B60W 2556/40
(Continued)

(56) References Cited

U.S. PATENT DOCUMENTS

| | | | |
|---|---|---|---|
| 7,409,295 | B2 | 8/2008 | Paradie |
| 8,204,542 | B2 | 6/2012 | Liao et al. |

(Continued)

FOREIGN PATENT DOCUMENTS

| | | |
|---|---|---|
| DE | 10 2013 208 521 A1 | 11/2014 |
| DE | 10 2015 221 920 A1 | 5/2017 |

(Continued)

OTHER PUBLICATIONS

Pannen, How to Keep HD Maps for Automated Driving Up to Date, IEEE International Conference on Robotics and Automation (ICRA), Aug. 2020 (Year: 2020).*

(Continued)

*Primary Examiner* — Andrea C Leggett
(74) *Attorney, Agent, or Firm* — Taylor Duma L.L.P.

(57) ABSTRACT

In various examples, health of a high definition (HD) map may be monitored to determine whether inaccuracies exist in one or more layers of the HD map. For example, as one or more vehicles rely on the HD map to traverse portions of an environment, disagreements between perception of the one or more vehicles, map layers of the HD map, and/or other disagreement types may be identified and aggregated. Where errors are identified that indicate a drop in health of the HD map, updated data may be crowdsourced from one or more vehicles corresponding to a location of disagreement within the HD map, and the updated data may be used to update, verify, and validate the HD map.

19 Claims, 13 Drawing Sheets

(58) Field of Classification Search
USPC ........................................................ 701/445
See application file for complete search history.

(56) References Cited

U.S. PATENT DOCUMENTS

| | | | |
|---|---|---|---|
| 8,204,642 B2 | 6/2012 | Tanaka et al. | |
| 9,098,751 B2 | 8/2015 | Hilldore et al. | |
| 9,373,057 B1 | 6/2016 | Erhan et al. | |
| 9,623,905 B2 | 4/2017 | Shashua et al. | |
| 9,701,307 B1 | 7/2017 | Newman et al. | |
| 9,710,714 B2 | 7/2017 | Chen et al. | |
| 9,721,471 B2 | 8/2017 | Chen et al. | |
| 9,742,869 B2 | 8/2017 | Bolotin et al. | |
| 10,007,269 B1 | 6/2018 | Gray | |
| 10,108,867 B1 | 10/2018 | Vallespi-Gonzalez et al. | |
| 10,133,274 B2 | 11/2018 | Shashua et al. | |
| 10,134,278 B1 | 11/2018 | Konrardy et al. | |
| 10,157,331 B1 | 12/2018 | Tang et al. | |
| 10,262,213 B2 | 4/2019 | Chen et al. | |
| 10,282,995 B2 | 5/2019 | Heinla et al. | |
| 10,289,469 B2 | 5/2019 | Fortino et al. | |
| 10,372,136 B2 | 8/2019 | Yang et al. | |
| 10,380,886 B2 | 8/2019 | Ran et al. | |
| 10,489,972 B2 | 11/2019 | Atsmon | |
| 10,580,158 B1 | 3/2020 | Mousavian et al. | |
| 10,586,456 B2 | 3/2020 | Wang | |
| 10,625,748 B1 | 4/2020 | Dong et al. | |
| 10,635,110 B2 | 4/2020 | Shashua et al. | |
| 10,730,517 B2 | 8/2020 | Park et al. | |
| 10,739,778 B2 | 8/2020 | Winkler et al. | |
| 10,740,954 B2 | 8/2020 | Liu | |
| 10,761,535 B2 | 9/2020 | Chen et al. | |
| 10,776,985 B2 | 9/2020 | Liu et al. | |
| 10,816,978 B1 | 10/2020 | Schwalb | |
| 10,829,116 B2 | 11/2020 | Tagnemma et al. | |
| 10,829,793 B2 | 11/2020 | Arikawa et al. | |
| 10,832,439 B1 | 11/2020 | Ma et al. | |
| 10,885,698 B2 | 1/2021 | Muthler et al. | |
| 10,942,030 B2 | 3/2021 | Haque et al. | |
| 11,042,163 B2 | 6/2021 | Chen et al. | |
| 11,210,537 B2 | 12/2021 | Koivisto et al. | |
| 11,321,924 B2 | 5/2022 | Molyneaux et al. | |
| 11,527,085 B1* | 12/2022 | Widjaja | H04N 23/80 |
| 2004/0016870 A1 | 1/2004 | Pawlicki et al. | |
| 2004/0252864 A1 | 12/2004 | Chang et al. | |
| 2005/0196034 A1 | 9/2005 | Hattori et al. | |
| 2007/0124064 A1 | 5/2007 | Fukui et al. | |
| 2007/0154068 A1 | 7/2007 | Stein et al. | |
| 2007/0182528 A1 | 8/2007 | Breed et al. | |
| 2008/0266396 A1 | 10/2008 | Stein | |
| 2009/0088941 A1 | 4/2009 | Tsuchiya et al. | |
| 2009/0097704 A1 | 4/2009 | Savidge et al. | |
| 2009/0256840 A1 | 10/2009 | Varadhan et al. | |
| 2010/0149193 A1 | 6/2010 | Yu | |
| 2010/0322476 A1 | 12/2010 | Kanhere et al. | |
| 2011/0044557 A1 | 2/2011 | Abraham et al. | |
| 2012/0194516 A1 | 8/2012 | Newcombe et al. | |
| 2013/0061033 A1 | 3/2013 | Kim et al. | |
| 2013/0100286 A1 | 4/2013 | Lao | |
| 2013/0106837 A1 | 5/2013 | Mukherjee et al. | |
| 2014/0104424 A1 | 4/2014 | Zhang et al. | |
| 2015/0054824 A1 | 2/2015 | Jiang | |
| 2015/0067672 A1 | 3/2015 | Mitra et al. | |
| 2015/0172626 A1 | 6/2015 | Martini | |
| 2015/0220257 A1* | 8/2015 | Moore | G06F 3/03 |
| | | | 715/765 |
| 2015/0242942 A1* | 8/2015 | Viswanath | G06Q 30/0633 |
| | | | 705/27.2 |
| 2015/0278578 A1 | 10/2015 | Otsuka et al. | |
| 2015/0304634 A1 | 10/2015 | Karvounis | |
| 2015/0346716 A1 | 12/2015 | Scharfe et al. | |
| 2016/0247290 A1 | 8/2016 | Liu et al. | |
| 2016/0321074 A1 | 11/2016 | Hung et al. | |
| 2016/0364907 A1 | 12/2016 | Schoenberg | |
| 2017/0010108 A1 | 1/2017 | Shashua | |

| | | | |
|---|---|---|---|
| 2017/0061625 A1 | 3/2017 | Estrada et al. | |
| 2017/0061632 A1 | 3/2017 | Lindner et al. | |
| 2017/0090478 A1 | 3/2017 | Blayvas et al. | |
| 2017/0116781 A1 | 4/2017 | Babahajiani et al. | |
| 2017/0124717 A1 | 5/2017 | Baruch et al. | |
| 2017/0124758 A1 | 5/2017 | Jia et al. | |
| 2017/0177950 A1 | 6/2017 | Hasberg | |
| 2017/0220876 A1 | 8/2017 | Gao et al. | |
| 2017/0236013 A1 | 8/2017 | Clayton et al. | |
| 2017/0259801 A1 | 9/2017 | Abou-Nasr et al. | |
| 2017/0344808 A1 | 11/2017 | El-Khamy et al. | |
| 2017/0357862 A1 | 12/2017 | Tatsubori | |
| 2017/0371340 A1 | 12/2017 | Cohen et al. | |
| 2017/0371346 A1 | 12/2017 | Mei et al. | |
| 2018/0089833 A1 | 3/2018 | Lewis et al. | |
| 2018/0121273 A1 | 5/2018 | Fortino et al. | |
| 2018/0136332 A1 | 5/2018 | Barfield et al. | |
| 2018/0158244 A1 | 6/2018 | Ybanez Zepeda et al. | |
| 2018/0164812 A1 | 6/2018 | Oh et al. | |
| 2018/0188059 A1 | 7/2018 | Wheeler et al. | |
| 2018/0203959 A1 | 7/2018 | Refsnaes et al. | |
| 2018/0232663 A1 | 8/2018 | Ross et al. | |
| 2018/0267558 A1 | 9/2018 | Tiwari et al. | |
| 2018/0276278 A1 | 9/2018 | Cagan et al. | |
| 2018/0300590 A1 | 10/2018 | Briggs et al. | |
| 2018/0304468 A1 | 10/2018 | Holz | |
| 2018/0348374 A1 | 12/2018 | Laddha et al. | |
| 2018/0349746 A1 | 12/2018 | Vallespi-Gonzalez | |
| 2018/0370540 A1 | 12/2018 | Yousuf et al. | |
| 2018/0373980 A1 | 12/2018 | Huval | |
| 2019/0016285 A1 | 1/2019 | Freienstein et al. | |
| 2019/0061771 A1 | 2/2019 | Bier et al. | |
| 2019/0065933 A1 | 2/2019 | Bogdoll et al. | |
| 2019/0066328 A1 | 2/2019 | Kwant et al. | |
| 2019/0071101 A1 | 3/2019 | Emura et al. | |
| 2019/0080467 A1 | 3/2019 | Hirzer et al. | |
| 2019/0101399 A1 | 4/2019 | Sunil Kumar et al. | |
| 2019/0102646 A1 | 4/2019 | Redmon et al. | |
| 2019/0102668 A1 | 4/2019 | Yao et al. | |
| 2019/0120640 A1 | 4/2019 | Ho et al. | |
| 2019/0129831 A1 | 5/2019 | Goldberg | |
| 2019/0146497 A1 | 5/2019 | Urtasun et al. | |
| 2019/0146500 A1 | 5/2019 | Yalla et al. | |
| 2019/0147600 A1 | 5/2019 | Karasev et al. | |
| 2019/0147610 A1 | 5/2019 | Frossard et al. | |
| 2019/0171912 A1 | 6/2019 | Vallespi-Gonzalez et al. | |
| 2019/0179979 A1 | 6/2019 | Melick | |
| 2019/0189001 A1 | 6/2019 | Smothers et al. | |
| 2019/0197774 A1 | 6/2019 | Molyneaux et al. | |
| 2019/0213481 A1 | 7/2019 | Godard et al. | |
| 2019/0235515 A1 | 8/2019 | Shirvani et al. | |
| 2019/0243371 A1 | 8/2019 | Nister et al. | |
| 2019/0250622 A1 | 8/2019 | Nister et al. | |
| 2019/0251442 A1 | 8/2019 | Koivisto et al. | |
| 2019/0258251 A1 | 8/2019 | Ditty et al. | |
| 2019/0302761 A1 | 10/2019 | Huang et al. | |
| 2020/0013176 A1 | 1/2020 | Kang et al. | |
| 2020/0080849 A1 | 3/2020 | Ondruska et al. | |
| 2020/0117213 A1 | 4/2020 | Tian et al. | |
| 2020/0117898 A1 | 4/2020 | Tian et al. | |
| 2020/0143205 A1 | 5/2020 | Yao et al. | |
| 2020/0160559 A1 | 5/2020 | Urtasun et al. | |
| 2020/0175311 A1 | 6/2020 | Xu et al. | |
| 2020/0200547 A1* | 6/2020 | Miller | G01C 21/3815 |
| 2020/0208994 A1 | 7/2020 | Askeland | |
| 2020/0208998 A1* | 7/2020 | Xiang | G01C 21/3492 |
| 2020/0232800 A1* | 7/2020 | Bai | G06T 7/38 |
| 2020/0257306 A1 | 8/2020 | Nisenzon | |
| 2020/0293064 A1 | 9/2020 | Wu et al. | |
| 2021/0025696 A1 | 1/2021 | Goto et al. | |
| 2021/0064980 A1 | 3/2021 | Heinrich et al. | |
| 2021/0089794 A1 | 3/2021 | Chen et al. | |
| 2021/0150722 A1 | 5/2021 | Homayounfar et al. | |
| 2021/0190537 A1* | 6/2021 | Gustafsson | G01C 21/3848 |
| 2021/0199442 A1* | 7/2021 | Xie | G06V 20/588 |
| 2021/0200801 A1* | 7/2021 | Agrawal | G06F 16/219 |
| 2021/0286923 A1 | 9/2021 | Kristensen et al. | |
| 2021/0300379 A1 | 9/2021 | Hackeloeer et al. | |
| 2021/0303849 A1* | 9/2021 | Dubroy | G06T 17/05 |

(56) References Cited

U.S. PATENT DOCUMENTS

| | | | | |
|---|---|---|---|---|
| 2021/0406559 A1* | 12/2021 | Efland | G06V 10/803 | |
| 2022/0132145 A1 | 4/2022 | Choi et al. | | |
| 2022/0146277 A1* | 5/2022 | Lambert | G05D 1/0231 | |
| 2022/0236077 A1* | 7/2022 | Clarysse | G01C 21/3878 | |
| 2022/0340160 A1* | 10/2022 | Nayhouse | B60W 30/09 | |
| 2023/0258472 A1* | 8/2023 | Ashman | G01C 21/3815 | |
| | | | | 701/24 |

FOREIGN PATENT DOCUMENTS

| | | | |
|---|---|---|---|
| DE | 10 2015 226 762 A1 | 6/2017 | |
| EP | 1 930 863 A2 | 6/2008 | |
| EP | 1 930 868 A1 | 6/2008 | |
| EP | 2 384 009 A2 | 11/2011 | |
| EP | 3 171 297 A1 | 5/2017 | |
| EP | 3 441 909 A1 | 2/2019 | |
| EP | 3696509 A1 | 8/2020 | |
| KR | 10-2012-0009590 A | 2/2012 | |
| WO | 2012/011713 A2 | 1/2012 | |
| WO | 2016/183074 A1 | 11/2016 | |
| WO | 2017/177128 A1 | 10/2017 | |
| WO | 2017/220705 A1 | 12/2017 | |
| WO | 2018/002910 A1 | 1/2018 | |
| WO | 2018/102717 A1 | 6/2018 | |
| WO | 2018/104563 A2 | 6/2018 | |
| WO | 2018/193254 A1 | 10/2018 | |
| WO | 2022226239 A1 | 10/2022 | |

OTHER PUBLICATIONS

Zhang, Real-Time HD Map Change Detection for Crowdsourcing Update Based on Mid-to-High-End Sensors', Sensors MDPI, published Apr. 2021 (Year: 2021).*

Son, Lane Line Map Estimation for Visual Alignment, 2020 IEEE International Conference on Artificial Intelligence and Virtual Reality, IEEE Xplore, 2020 (Year: 2020).*

Xie, S., and Tu, Z., "Holistically-Nested Edge Detection", Computer Vision Foundation, pp. 1395-1403 (2015).

Yang, Z., "Research on Lane Recognition Algorithm Based on Deep Learning", International Conference on Artificial Intelligence and Advanced Manufacturing (AIAM), IEEE, pp. 387-391 (2019).

Yao, J., et al., "Estimating Drivable Collision-Free Space From Monocular Video," IEEE Winter Conference on Applications of Computer Vision (WACV), pp. 1-10 (2015).

Zbontar, J., and Lecun, Y., "Stereo Matching by Training a Convolutional Neural Network to Compare Image Patches", Journal of Machine Learning Research, vol. 17, pp. 1-32 (2016).

Zhao, H., et al., "Loss Functions for Image Restoration With Neural Networks", IEEE Transactions on Computational Imaging, vol. 3, No. 1, pp. 1-11 (Mar. 2017).

Zhong, Y., et al., "Self-Supervised Learning for Stereo Matching With Self-Improving Ability", arXiv:1709.00930v1 [cs.CV], pp. 1-13 (Sep. 4, 2017).

Invitation to pay additional fees received for PCT Application No. PCT/US2019/018348, mailed on May 29, 2019, 18 pages.

Invitation to pay additional fees received for PCT Application No. PCT/US2019/019656, mailed on May 31, 2019, 9 pages.

International Search Report and Written Opinion mailed Jun. 26, 2019 in International Application No. PCT/US2019/024400, 11 pages.

Invitation to pay additional fees received for PCT Application No. PCT/US2019/022592, mailed on Jun. 26, 2019, 9 pages.

International Search Report and Written Opinion received for PCT Patent Application No. PCT/US2019/019656, mailed on Jul. 24, 2019, 14 pages.

International Search Report and Written Opinion received for PCT Patent Application No. PCT/US2019/018348, mailed on Jul. 25, 2019, 21 pages.

International Search Report and Written Opinion received for PCT Patent Application No. PCT/US2019/022592, mailed on Aug. 26, 2019, 14 pages.

International Search Report and Written Opinion mailed Oct. 18, 2019 in International Patent Application No. PCT/US2019/042225, 11 pages.

International Search Report and Written Opinion mailed on Nov. 7, 2019 in International Patent Application No. PCT/US2019/022753, 18 Pages.

International Search Report and Written Opinion received for PCT Patent Application No. PCT/US2019/068764, mailed on Apr. 22, 2020, 15 pages.

International Search Report and Written Opinion received for PCT Patent Application No. PCT/US2019/068766, mailed on Apr. 22, 2020, 13 pages.

Invitation to pay additional fees received for PCT Application No. PCT/US2020/028116, mailed on Jul. 21, 2020, 12 pages.

International Search Report and Written Opinion in International Patent Application No. PCT /US2020/021894 mailed on Aug. 3, 2020, 14 pages.

International Preliminary Report on Patentability received for PCT Application No. PCT/US2019/018348, mailed on Aug. 27, 2020, 16 pages.

International Preliminary Report on Patentability received for PCT Application No. PCT/US2019/019656, mailed on Sep. 3, 2020, 11 pages.

International Search Report and Written Opinion received for PCT Patent Application No. PCT/US2020/028116, mailed on Sep. 11, 2020, 17 pages.

International Preliminary Report on Patentability received for PCT Application No. PCT/US2019/022592, mailed on Sep. 24, 2020, 11 pages.

International Preliminary Report on Patentability received for PCT Application No. PCT/US2019/022753, mailed on Oct. 1, 2020, 14 pages.

International Preliminary Report on Patentability received for PCT Application No. PCT/US2019/024400, mailed on Oct. 8, 2020, 10 pages.

International Search Report and Written Opinion received for PCT Patent Application No. PCT/US2020/039430, mailed in Oct. 9, 2020, 13 pages.

International Search Report and Written Opinion received for PCT Patent Application No. PCT/US2020/048786, mailed on Nov. 12, 2020, 13 pages.

International Preliminary Report on Patentability received for PCT Patent Application No. PCT/US2019/042225, mailed on Jan. 28, 2021, 9 pages.

International Search Report and Written Opinion received for PCT Patent Application No. PCT/US2020/062869, mailed on Mar. 17, 2021, 11 pages.

International Preliminary Report on Patentability received for PCT Application No. PCT/US2019/068764, mailed on Jul. 8, 2021, 12 pages.

International Preliminary Report on Patentability received for PCT Application No. PCT/US2019/068766, mailed on Jul. 8, 2021, 10 pages.

International Preliminary Report on Patentability received for PCT Application No. PCT/US2020/021894, mailed on Sep. 23, 2021, 11 pages.

International Preliminary Report on Patentability received for PCT Application No. PCT/US2020/028116, mailed on Nov. 4, 2021, 14 pages.

International Preliminary Report on Patentability received for PCT Application No. PCT/US2020/039430, mailed on Jan. 6, 2022, 12 pages.

International Preliminary Report on Patentability received for PCT Application No. PCT/US2020/048786, mailed on Mar. 10, 2022, 11 pages.

Notice of Allowance dated May 11, 2022 in U.S. Appl. No. 16/911,007, 9 pages.

"Methodology of Using a Single Controller (ECU) for a Fault-Tolerant/Fail-Operational Self-Driving System", U.S. Appl. No. 62/524,283, filed Jun. 23, 2017.

"Systems and Methods for Safe and Reliable Autonomous Vehicles", U.S. Appl. No. 62/584,549, filed Nov. 10, 2017.

(56) References Cited

OTHER PUBLICATIONS

"System and Method for Controlling Autonomous Vehicles", U.S. Appl. No. 62/614,466, filed Jan. 17, 2018.
"System and Method for Safe Operation of Autonomous Vehicles", U.S. Appl. No. 62/625,351, filed Feb. 2, 2018.
"Conservative Control for Zone Driving of Autonomous Vehicles", U.S. Appl. No. 62/628,831, filed Feb. 9, 2018.
"Systems and Methods for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for Autonomousvehicles", U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Methods for Accurate Real-time Lane and Road Boundary Detection for Autonomous Driving", U.S. Appl. No. 62/636,142, filed Feb. 27, 2018.
"Convolutional Neural Networks to Detect Drivable Freespace for Autonomous Vehicles", U.S. Appl. No. 62/643,665, filed Mar. 15, 2018.
"Energy Based Reflection Filter for Denoising Ray-Traced Glossy Reflections", U.S. Appl. No. 62/644,386, filed Mar. 17, 2018.
"Geometric Shadow Filter for Denoising Ray-Traced Shadows", U.S. Appl. No. 62/644,385, filed Mar. 17, 2018.
"Adaptive Occlusion Sampling of Rectangular Area Lights with Voxel Cone Tracing", U.S. Appl. No. 62/644,806, filed Mar. 19, 2018.
Akbarzadeh, Amir; International Preliminary Report on Patentability for PCT Application No. PCT/US2022/025838, filed Apr. 21, 2022, mailed Nov. 2, 2023, 16 pgs.
International Search Report and Written Opinion for PCT Application No. PCT/US2022/025838, filed Apr. 21, 2022, mailed Aug. 3, 2022, 18 pgs.
"Distance Based Ambient Occlusion Filter for Denoising Ambient Occlusions", U.S. Appl. No. 62/644,601, filed Mar. 19, 2018.
"Deep Neural Network for Estimating Depth from Stereo Using Semi-Supervised Learning", U.S. Appl. No. 62/646,148, filed Mar. 21, 2018.
"Video Prediction Using Spatially Displaced Convolution", U.S. Appl. No. 62/646,309, filed Mar. 21, 2018.
"Video Prediction Using Spatially Displaced Convolution", U.S. Appl. No. 62/647,545, filed Mar. 23, 2018.
"Network Injection Rate Limiting", U.S. Appl. No. 62/648,326, filed Mar. 26, 2018.
"Network Synchronization Using Posted Operation Tracking for Flush Semantics", U.S. Appl. No. 62/648,333, filed Mar. 26, 2018.
"System and Methods for Advanced AI-Assisted Vehicles", U.S. Appl. No. 62/648,358, filed Mar. 26, 2018.
"Method and System of Remote Operation of a Vehicle Using an Immersive Virtual Reality Environment", U.S. Appl. No. 62/648,493, filed Mar. 27, 2018.
"System and Method for Training, Testing, Verifying, and Validating Autonomous and Semi-Autonomous Vehicles", U.S. Appl. No. 62/648,399, filed Mar. 27, 2018.
"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
"Methods for High-Precision, High-Accuracy Lane Detection in Autonomous Driving Applications", U.S. Appl. No. 62/699,669, filed Jul. 17, 2018.
"Distance to Obstacle Detection in Autonomous Driving Applications", U.S. Appl. No. 62/786,188, filed Dec. 28, 2018.

"Detection and Classification of Wait Conditions in Autonomous Driving Applications", U.S. Appl. No. 62/816,838, filed Mar. 11, 2019.
"Intersection Detection and Handling Using Live Perception in Autonomous Driving Applications", U.S. Appl. No. 62/839,155, filed Apr. 26, 2019.
"Intersection Contention Area Detection Using Live Perception in Autonomous Driving Applications", U.S. Appl. No. 62/866,158, filed Jun. 25, 2019.
"Lidar range Image Processing for Autonomous Vehicle Applications", U.S. Appl. No. 62/893,814, filed Aug. 30, 2019.
"Euler spiral", Wikipedia, Retrieved from Internet URL : https://en.wikipedia.org/wiki/Euler_spiral, accessed on Feb. 21, 2019, pp. 10.
"F1 score", Wikipedia, Retrieved from Internet URL : https://en.wikipedia.org/wiki/F-score, accessed on Feb. 21, 2019, pp. 3.
"Implementation of Control Flow in TensorFlow" TensorFlow Authors, Retrieved from the Internet URL : http://download.tensorflow.org/paper/white_paper_tf_control_flow_implementation_2017_11_1.pdf, pp. 1-18 (Nov. 1, 2016).
"Neural Networks", Retrieved from Internet URL : https://www.tensorflow.org/api_guides/python/nn#conv2d_transpose, accessed on Mar. 1, 2019, pp. 14.
"Polynomial curve fitting", Retrieved from Internet URL : https://www.mathworks.com/help/matlab/ref/polyfit.html, accessed on Feb. 21, 2019, pp. 13.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
"Tensorflow", Retrieved from the Internet URL :https://github.com/tensorflow/tensorflow/blob/master/tensorflow/core/kernels/hinge-loss.h, accessed on May 16, 2019, pp. 1-4.
"Tf.while_loop much slower than static graph? #9527", tensorflow, Retrieved from the Internet URL: https://github.com/tensorflow/tensorflow/issues/9527, accessed on May 16, 2019, pp. 1-7.
"Tf.losses.get_regularization_loss", TensorFlow Core 1.13, Retrieved from the Internet URL : https://www.tensorflow.org/api_docs/python/tf/losses/get_regularization_loss, accessed on May 16, 2019, pp. 1-1.
What is polyline?, Webopedia Definition, Retrieved from Internet URL : https://www.webopedia.com/TERM/P/polyline.html, accessed on Feb. 21, 2019, pp. 4.
"What are deconvolutional layers?", Data Science Stack Exchange, Retrieved from Internet URL : https://datascience.stackexchange.com/questions/6107/what%E2%80%90are%E2%80%90deconvolutional%E2%80%90layers, accessed on Feb. 21, 2019, pp. 21.
Allison, R. S., et al., "Binocular depth discrimination and estimation beyond interaction space", Journal of Vision, vol. 9, No. 1, pp. 1-14 (Jan. 2009).
Alvarez, J. M., et al., "Road Scene Segmentation from a Single Image", In Proceedings of the 12th European Conference on Computer Vision—vol. Part VII, ECCV'12, pp. 376-389 (2012).
Asvadi, A., et al., "DepthCN: Vehicle detection using 3D-LIDAR and ConvNet", IEEE 20th International Conference on Intelligent Transportation Systems (ITSC), pp. 1-6 (2017).
Bach, M., et al., "Multi-Camera Traffic Light Recognition Using A Classifying Labelled Multi-Bernoulli Filter", In 2017 IEEE Intelligent Vehicles Symposium (IV), pp. 1045-1051 (Jun. 11-14, 2017).
Badino, H., et al., "Free Space Computation Using Stochastic Occupancy Grids and Dynamic Programming", Worshop on Dynamical Vision at ICCV, pp. 1-12 (Oct. 2007).
Badino, H., et al., "The Stixel World—A Compact Medium Level Representation of The 3d-World", In DAGM, pp. 1-10 (2009).

(56)          References Cited

OTHER PUBLICATIONS

Benenson, R., et al., "Stixels Estimation Without Depth Map Computation", In ICCV, pp. 1-8 (2011).

Bidlack, C. et al., "Visual Robot Navigation Using Flat Earth Obstacle Projection", Proceedings of The IEEE International Conference on Robotics and Automation, pp. 3374-3381 (May 8, 1994).

Bojarski, M., et al., "End to End Learning for Self-Driving Cars", arXiv: 1604.07316v1 [cs.CV], XP055570062, Retrieved from the Internet URL:https://nvidia.com/content/tegra/automotive/images/2016/solutions/pdf/end-to-end-dl-using-px.pdf, pp. 1-9 (Apr. 25, 2016).

Borland, D., and Taylor II, R. M.," Rainbow Color Map (Still) Considered Harmful", IEEE Computer Graphics and Applications, vol. 27, No. 2, pp. 1-17 (Mar./Apr. 2007).

Brust, C. A., et al., "Convolutional Patch Networks With Spatial Prior for Road Detection and Urban Scene Understanding", In International Conference on Computer Vision Theory and Applications (VISAPP), arXiv:1502.06344v1 [cs.CV], pp. 1-9 (Feb. 23, 2015).

Chen, J., et al., "FOAD: Fast Optimization-based Autonomous Driving Motion Planner", 2018 Annual American Control Conference (ACC), IEEE, pp. 1-8 (Jun. 27-29, 2018).

Cheng, G., et al., "Automatic Road Detection and Centerline Extraction via Cascaded End-to-End Convolutional Neural Network", IEEE Transactions on Geoscience and Remote Sensing vol. 55, No. 6, pp. 3322-3337 (Jun. 1, 2017).

Chilamkurthy, S., "A 2017 Guide to Semantic Segmentation with Deep Learning", Qure.ai Blog, Retrieved from Internet URL : http://blog.qure.ai/notes/semantic-segmentation-deep-learning-review, accessed on Feb. 21, 2019, pp. 16 (Jul. 5, 2017).

Clevert, D.-A., et al., "Fast and Accurate Deep Network Learning by Exponential Linear Units (ELUs)", ICLR 2016, pp. 1-14 (Feb. 22, 2016).

Cormack, R. H., "Stereoscopic depth perception at far viewing distances", Perception & Psychophysics, vol. 35, No. 5, pp. 423-428 (Sep. 1984).

Deshpande, A., "A Beginner's Guide to Understanding Convolutional Neural Networks", accessed at: https://adeshpande3.github.io/A-Beginner's-Guide-To-Understanding-Convolutional-Neural-Networks/, Accessed on Feb. 21, 2019, pp. 1-13.

Dipietro, R., "A Friendly Introduction to Cross-Entropy Loss," Version 0.1, Accessed on Feb. 21, 2019 at: https://rdipietro.github.io/friendly-intro-to-cross-entropy-loss/, pp. 1-10 (May 2, 2016).

Du, L., and Du, Y., "Hardware Accelerator Design for Machine Learning", Machine Learning-Advanced Techniques and Emerging Applications, pp. 1-14 (2017).

Eigen,D., et al., "Depth Map Prediction from a Single Image using a Multi-Scale Deep Network", NIPS, pp. 1-9, (2014).

Elfes, A., "Sonar-Based Real-World Mapping and Navigation", IEEE Journal on Robotics and Automation, vol. 3, Issue: 3, pp. 249-265 (Jun. 1987).

Foley, D., and Danskin, J., "Ultra-Performance Pascal GPU and NVLink Interconnect," IEEE Computer Society, IEEE Micro, vol. 37, No. 2, pp. 1-11 (Mar./Apr. 2017).

Franke, U., and Kutzbach., I., "Fast Stereo Based Object Detection for Stop & Go Traffic", pp. 1-6 (1996).

Fukunaga, K., and Hostetler, L., "The estimation of the gradient of a density function, with applications in pattern recognition", IEEE Transactions on Information Theory, vol. 21, No. 1, pp. 32-40 (Jan. 1975).

Gao, J., et al., "Embedding Structured Contour and Location Prior in Siamesed Fully Convolutional Networks for Road Detection", in IEEE Transactions on Intelligent Transportation Systems, vol. 19, No. 1, pp. 1-6 (Jan. 2018).

Garg, R., et al., "Unsupervised CNN for Single View Depth Estimation: Geometry to the Rescue", ECCV 2016, pp. 1-16 (Jul. 29, 2016).

Garnett, N., et al., "Real-Time Category-Based and General Obstacle Detection for Autonomous Driving", IEEE International Conference on Computer Vision Workshops (ICCVW), IEEE, pp. 198-205 (2017).

Geiger, A., et al., "Vision meets Robotics: The KITTI Dataset", The International Journal of Robotics Research, pp. 1-6 (2013).

Gidaris, S., and Komodakis, N., "Detect, Replace, Refine: Deep Structured Prediction for Pixel Wise Labeling", Computer Vision and Pattern Recognition, pp. 1-21 (Dec. 14, 2016).

Godard, C., et al., "Unsupervised Monocular Depth Estimation with Left-Right Consistency", IEEE Computer Society Conference on Computer Vision and Pattern Recognition, pp. 270-279 (Jul. 21, 2017).

Gregory, R. L., "Eye and brain : The psychology of seeing", World University Library, pp. 130 (1966) (Part 1).

Gregory, R. L., "Eye and brain : The psychology of seeing", World University Library, pp. 130 (1966) (Part 2).

Guney, F., et al., Displets: Resolving Stereo Ambiguities using Object Knowledge:, IEEE Conference on Computer Vision and Pattern Recognition (CVPR), pp. 1-11 (Jun. 7-12, 2015).

Han, S., et al., "Learning Both Weights and Connections for Efficient Neural Networks", arXiv:1506.02626v3 [cs.NE], pp. 1-9 (Oct. 30, 2015).

Hartley, R., and Zisserman, A., "Multiple View Geometry in Computer Vision", Cambridge University Press, pp. 1-48 (2004).

He, K., et al., "Deep Residual Learning for Image Recognition", Proceedings of IEEE, Conference on Computer Vision and Pattern Recognition (CVPR), pp. 770-778 (2016).

He, L., et al., "Learning Depth from Single Images with Deep Neural Network Embedding Focal Length", arXiv:1803.10039v1 [cs.CV], pp. 1-14 (Mar. 27, 2018).

* cited by examiner

400

SYSTEM
UNAVAILABLE
AL < PE < PL

SYSTEM
UNAVAILABLE &
MISLEADING
INFORMATION
AL < PL < PE

HAZARDOUSLY
OPERATIONS
PL < AL < PE

ALERT LIMIT (AL)

SYSTEM
UNAVAILABLE
PE < AL < PL

ALERT LIMIT (AL)

NOMINAL
OPERATIONS
PE < PL < AL

MISLEADING
OPERATIONS
PL < PE < AL

PROTECTION LEVEL (PL)

POSITION ERROR (PE)

500

LOCALIZATION

GROUND TRUTH

PATH

LANE

ROAD

600

DETERMINE DISAGREEMENT BETWEEN PERCEPTION OF
ENVIRONMENT AND MAP DATA
B602

DETERMINE LOCATION CORRESPONDING TO
DISAGREEMENT
B604

GENERATE DATA CORRESPONDING TO LOCATION
B606

UPDATE MAP DATA BASED AT LEAST IN PART ON DATA
B608

700

GENERATE INDICATION OF MAP HEALTH CORRESPONDING TO PORTION OF MAP DATA
B702

TRANSMIT MAPSTREAM DATA TO REMOTE SERVER
B704

CAUSING REMOTE SERVER TO UPDATE PORTION OF MAP DATA
B706

STEREO CAMERA 868

MID-RANGE CAMERA, WING MIRROR MOUNT 898

SURROUND CAMERA 874

MID-RANGE CAMERA, WING MIRROR MOUNT 898

SURROUND CAMERA(S) 874

SURROUND CAMERA(S) 874

INFRARED CAMERA 872

WIDE VIEW CAMERA 870

LONG-RANGE CAMERA 898

LONG-RANGE CAMERA 898

STEREO CAMERA 868

1000

MAP HEALTH MONITORING FOR AUTONOMOUS SYSTEMS AND APPLICATIONS

CROSS-REFERENCE TO RELATED APPLICATIONS

This application claims the benefit of U.S. Provisional Application No. 63/177,813, filed on Apr. 21, 2021, which is hereby incorporated by reference in its entirety. This application is related to U.S. Non-Provisional application Ser. No. 17/007,873, filed on Aug. 31, 2020, U.S. Non-Provisional application Ser. No. 17/008,074, filed on Aug. 31, 2020, and U.S. Non-Provisional application Ser. No. 17/008,100, filed on Aug. 31, 2020, each of which is hereby incorporated by reference in its entirety.

BACKGROUND

Accurate mapping and localization are vital processes for autonomous driving functionality. High definition (HD) maps, sensor perception, or a combination thereof are often used to localize a vehicle with respect to an HD map in order to make planning and control decisions. However, errors between the HD map and the sensor perception may prevent an ego-machine from properly localizing and/or safely operating autonomously. For example, a few meters of inaccuracy may place the ego-machine in a different lane than the current lane of travel, thereby decreasing the safety of the driving experience. As such, it is important that the ego-machine is able to accurately localize to the HD map.

To address deficiencies in HD maps, conventional systems often rely on human knowledge of errors, or changes to road conditions, prior to updating the HD map. For example, changes to road conditions, or identified errors in the HD map, may be determined and one or more data collection vehicles may be sent out to generate updated data for the HD map to rely on. However, identifying issues in this manner is a slow process that leaves the HD map in use where the map is not in a suitable condition for use, or requires taking the HD map offline until the issues are addressed. As another example, where the errors are not diagnosed—at least immediately—the HD map may continue to be relied upon by consumers, which can cause misalignment between the HD map and a perception system of the ego-vehicle. Reliance on less than accurate HD map data may present a significant obstacle to achieving highly autonomous driving levels (e.g., ASIL Level 3, 4, and 5) that are both safe and reliable.

SUMMARY

Embodiments of the present disclosure relate to map health monitoring for autonomous machine system and applications. Systems and methods are disclosed that compare a perception system of an ego-machine to a HD map to determine the accuracy of the HD map. For example, various data pipelines—such as sensor data—from the ego-machine may be provided to a map health verifier (e.g., source code or other executable logic executed by one or more processors) and compared against elements of the HD map—such as a lane graph layer, a static obstacles layer, etc.

In contrast to conventional systems, such as those described above, in some embodiments, the system may determine a level of agreement between the perception system of the ego-machine and the HD map by localizing the ego-machine within the HD map. The system may then compare current perception of the ego-machine with the information provided by the HD map. For example, the system may evaluate a lane center with respect to the ego-machine to determine whether the ego-machine localization within the HD map agrees with the current perception of the ego-machine. When the perception of the ego-machine and the information provided by the HD map are not in agreement (misaligned) with one another, there may be an error in the HD map, components of the perception system, and/or with an alignment system.

In some embodiments, disagreements between the HD map, components of the perception system, and/or with an alignment system that exceed a threshold level may be aggregated and stored. Different layers of the HD map (e.g., lane planning, lane graph, static obstacles, etc.) may be weighted differently based at least in part on how significant an error in a particular layer will affect the driving experience—e.g., will affect the safety of the ego-machine when relying on the respective layer of the HD map if an error or disagreement is present. When the aggregated disagreement exceeds a threshold level, the system may cut off the ego-machine's access to the map so that the faulty portion of the HD map is not used by the ego-machine. Further, the system may upload data associated with the detected disagreements—such as perception data, alignment data, HD map data, etc.—that may be used to cure the error and/or inform other systems not to rely on the HD map. For example, updated perception data corresponding to the location at issue may be generated using one or more deployed vehicles—e.g., via crowdsourcing—to update the HD map at least at the location. Because the HD map may include various layer types, and an issue may be identified with respect to particular layer, the data required for collection may be selectively determined based on the layer type—e.g., where the layer type is a RADAR localization layer, then the data generated may include RADAR data.

BRIEF DESCRIPTION OF THE DRAWINGS

The present systems and methods for map health monitoring for autonomous machine systems and applications are described in detail below with reference to the attached drawing figures, wherein.

DETAILED DESCRIPTION

Figure 1:
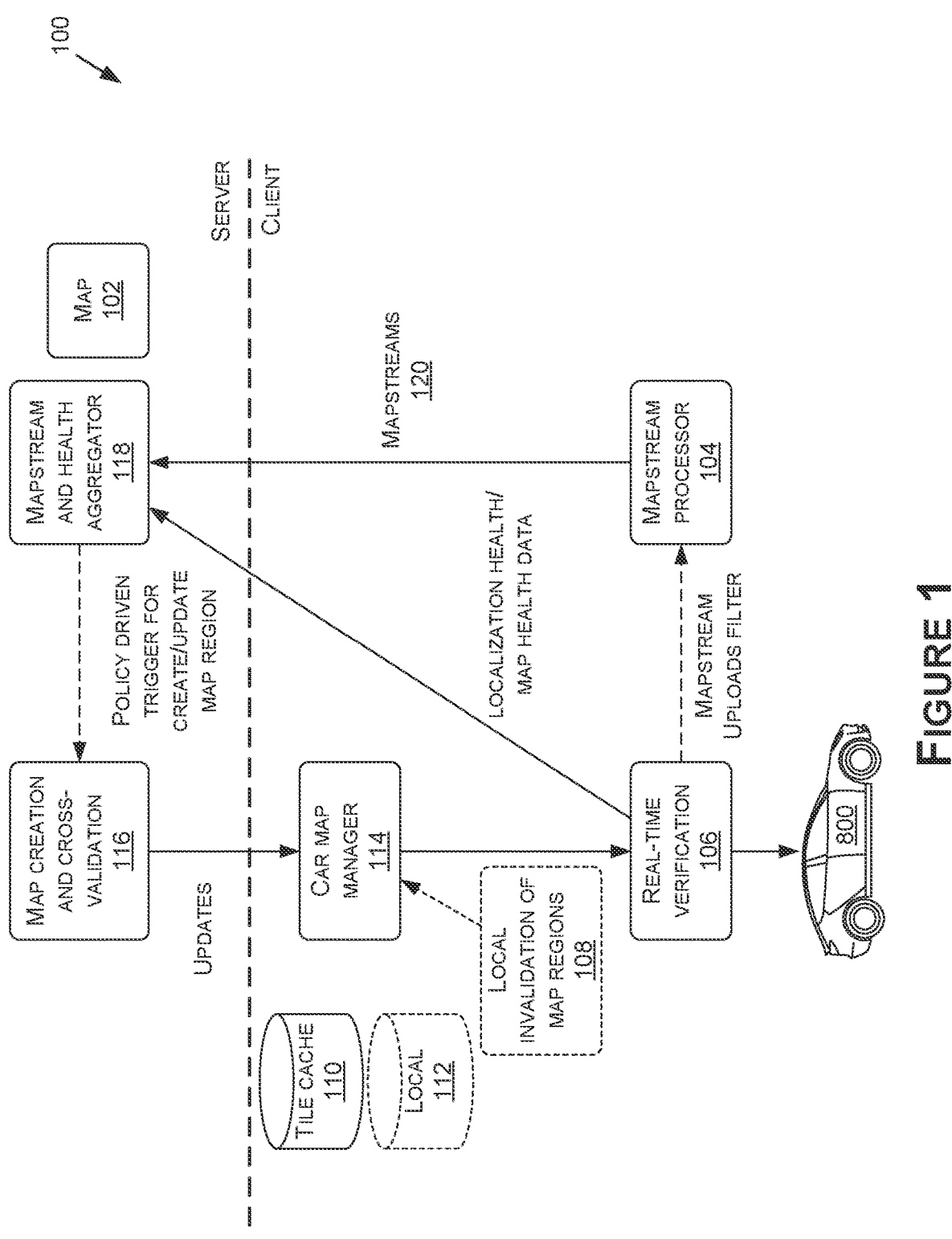
FIG. 1 illustrates an example end-to-end design configuration for a map health monitoring system, in accordance with some embodiments of the present disclosure.

Systems and methods are disclosed related to map health monitoring for autonomous machine systems and applications. Although the present disclosure may be described with respect to an example autonomous vehicle 800 (alternatively referred to herein as "vehicle 800" or "ego-machine 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to evaluating the health of an HD map, this is not intended to be limiting, and the systems and methods described herein may be used in augmented reality, virtual reality, mixed reality, robotics, security and surveillance, autonomous or semi-autonomous machine applications, and/or any other technology spaces where evaluating the health of an HD map or other map may be used.

In some embodiments, the system may determine a level of agreement or disagreement between the perception system of the ego-machine and the HD map based, in part, on localizing the ego-machine with respect to the HD map. For example, to localize, the system may determine a correspondence between sensor data and/or perception results (e.g., landmark locations) from the perception system and corresponding map information from the HD map. The system, in various embodiments, then compares current perception of the ego-machine with element information or other information provided by the HD map (e.g., stored in one or more layers of the HD map). For example, the system may evaluate a lane center with respect to the ego-machine to determine whether the ego-machine localization within the HD map agrees with the current perception of the ego-machine. Based at least in part on this evaluation, the system may determine whether the perception system of the ego-machine and the HD map are aligned and in agreement, in an embodiment.

In some embodiments, when the perception of the ego-machine and the information provided by the HD map are not in agreement with one another, the system may determine that there is an error in the HD map, or with one or more components of the perception system, and/or with an alignment system. In various embodiments, the system may produce localization confidence values per sensor (e.g., RADAR, LiDAR, camera, etc.). For example, when a camera/RADAR localization confidence value is low (e.g., poor), the system may determine that there is poor map coverage, that the map coverage may not accurately reflect reality, that the camera/RADAR calibration may be inaccurate, the perception system or component thereof (e.g., machine learning model) may be inaccurate, and/or that relative ego-motion data may be inaccurate. In some examples, camera and RADAR localization may not align, but each may have a high localization confidence value. In such examples, this may indicate a misalignment between the camera sensor data and the RADAR sensor data.

In some embodiments, different layers (e.g., lane planning, lane graph, static obstacles, etc.) may be weighted differently based at least in part on how significant an error in a particular layer will affect the driving experience—e.g., will affect the safety of the operation of the ego-machine were the ego-machine to rely on a respective layer of the HD map including the disagreement or error. For example, a misalignment between the perception system and the HD map for a location of a roadway sign may be much less impactful on driving compared to a misalignment between the perception system and the HD map for a location of a lane of a roadway. In various embodiments, when the system determines that there is a disagreement between the HD map, components of the perception system, and/or with an alignment system, the system may apply a weight to the error to produce an error value corresponding to a road segment and/or an element on the road segment (e.g., sign, lane, wait line, traffic light, tunnel, etc.). In an embodiment, detected errors may be aggregated and stored locally in the ego-machine and/or in the cloud.

When the aggregated disagreement exceeds a threshold level, in various embodiments, the system may cut off and/or restrict the ego-machine's access to the map so that the faulty portion of the HD map is not relied on by the ego-machine for driving. For example, access to the faulty portion of the HD map may be restricted until the error is resolved and the perception system of the ego-machine and the HD map are back within a threshold level of alignment. In another example, the system may determine that the perception system and the HD map of the ego-machine do not align with respect to a wait line on a particular road segment. Based at least in part on the misalignment, in such examples, the system may restrict the ego-machine from relying on the HD map in this road segment. In an embodiment, the ego-machine may then receive an updated HD map or an updated portion of the HD map for the particular road segment. Then, the next time the ego-machine passes through this road segment, in such embodiments, the system may verify that the perception system and the HD map are in alignment. Once this has been verified, for example, the system may resume reliance on the HD map for this road segment. In some embodiments, a separate ego-machine may verify that the HD map has been properly updated and the system may resume reliance on the HD map based at least in part on the alignment being verified by the separate ego-machine.

Further, in various embodiments, when the aggregated disagreement exceeds a threshold level, the system may upload data associated with the detected disagreements—such as perception data, alignment data, HD map data, etc. (map health data)—that may be used to cure the error in the map/perception system and/or inform other systems not to rely on the HD map. Additionally or alternatively, when an error is detected, the system may send map health data associated with every layer of the HD map. In some embodiments, the system may verify the alignment of the perception system and the HD map whenever the ego-machine is driving for each road segment the ego machine passes by and/or travels within. However, due to bandwidth restrictions, the system may only send map health data when an error is detected. In some embodiments, each time an ego-machine passes by and/or travels within a road segment, the system may upload an indication as to whether the road segment is healthy—e.g., that there are no errors. In such embodiments, the indication may serve as a timestamp showing the last time that a road segment was verified to be healthy. In some embodiments, the system may determine that a particular road segment has not been verified for a threshold amount of time and may send map health data to the cloud, even though there may be no detected errors in the particular road segment.

In some embodiments of the current disclosure, the systems and methods are described that provide end-to-end (E2E) map (server-side and in-car) validation for various different types of maps including HD maps. Example systems and methods described below may be able to validate and/or verify maps (e.g., map data maintained server-side and/or by the ego-machine) before actuating on them and be able to invalidate parts of the map based at least in part on detected changes (e.g., either immediately or based on accumulation of evidence). Further, in various embodiments, map invalidation and map validation may be asymmetric in terms of time/effort that may be needed. In one example, map invalidation requires errors reported by a plurality of ego-machines whereas map validation requires a single ego-machine to validate the map data based at least in part on sensor data.

With reference to FIG. 1, FIG. 1 is an example 100 end-to-end design configuration for a map health monitoring system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

In various embodiments, mapstreams 120, as described herein, may include streams of sensor data captured or otherwise generated by one or more sensors of a vehicle, perception outputs from deep neural networks (DNNs), and/or relative trajectory (e.g., rotation and translation) data corresponding to any number of drives (e.g., operation of the vehicle along a route) by any number of vehicles. In such embodiments, in contrast to a systematic data collection effort of conventional systems, the current systems may crowdsource data generation using many vehicles and many drives.

During map 102 creation and/or updating (e.g., operation of a map creation and cross-validation 116 component of one or more server computer systems), the mapstreams 120 may be used to generate map data—and ultimately a fused HD map—that represents data generated over a plurality of drives. In addition, as new mapstreams 120 are generated, these additional drives may be merged, combined, or integrated with existing mapstream data and used to further increase the robustness of the map 102. In an embodiment, the mapstreams 120 are generated (e.g., based at least in part on sensor data) by a mapstream processor 104 and provided to a mapstream and health aggregator 118. For example, each of the mapstreams 120 may be converted to a respective map (e.g., map 102), and any number of drive segments from any number of maps (or corresponding mapstreams 120) may be used to generate a fused HD map representation of the particular drive segment. For example, the map creation and cross-validation component 116 of the system generates the map 102 based at least in part on aggregated mapstreams 120 (e.g., aggregated from a plurality of drives and/or ego-machines) obtained from the mapstream and health aggregator 118. As illustrated in FIG. 1, the system, in an embodiment, includes a policy indicating one or more triggers from creating and/or updating the map 102 or a region thereof.

In an embodiment, pairs of the drive segments may be geometrically registered with respect to one another to determine pose links representing rotation and translation between poses (or frames) of the pairs of drives. In an example, frame graphs representing the pose links may be divided into road segments—e.g., the road segments that are used for relative localization—and the poses corresponding to each road segment may undergo optimization. The resulting, finalized poses within each segment, in various examples, may be used to fuse various sensor data and/or perception outputs for generating a final fused and/or updated HD map—or portion or segment thereof. As a result, and because the map data corresponds to consumer quality sensors, in various embodiments, the sensor data and/or perception results (e.g., landmark locations) from the map 102 may be used directly for localization (e.g., by comparing current real-time sensor data and/or perception to corresponding map information), in addition to, in embodiments, using Global Navigation Satellite System (GNSS) data.

For example, when localizing (e.g., generating localization health data) to the map 102, individual localization results may be generated based at least in part on comparisons of sensor data and/or perception outputs from a sensor modality to map data corresponding to the same sensor modality. In various embodiments, a local invalidation of map regions 108 can be performed by the ego-machine (e.g., real-time during a drive). In such embodiments, the results of localization (e.g., localization health data) is maintained in a local 112 data store. For the purposes of the example 100 illustrated in FIG. 1, dashed lines indicate components that may be optionally added and/or removed from the system. Returning to the example above, when localizing to the map 102, cost spaces may be sampled at each frame using the data corresponding to a sensor modality, aggregate cost spaces may be generated using a plurality of the individual cost spaces, and filtering (e.g., using a Kalman filter) may be used to finalize on a localization result for the particular sensor modality. In various embodiments, this process may be repeated for any number of sensor modalities—e.g., LiDAR, RADAR, camera, etc.—and the results may be fused together to determine a final fused localization result for the current frame. In an example, the fused localization result may then be carried forward to a next frame, and used to determine the fused localization for the next frame, and so on. As illustrated in FIG. 1, the real-time verification 106 component of the system provides localization health and/or map health data to the mapstream and health aggregator 118. In one example, the localization health and/or map health data include localization and map health data as described below and information indicating a tile and or layer of the map 102 associated with the localization health and/or map health data. As a result of the map 102 including individual road segments for localization, and each road segment having a corresponding global location, a global localization result may also be realized as the vehicle localizes to the local or relative coordinate system corresponding to the road segment in various embodiments.

In various embodiments, to generate mapstreams 120, any number of vehicles 800—e.g., consumer vehicles, data collection vehicles, a combination thereof—may execute any number of drives. For example, each vehicle 800 may drive through various road segments from locations around a town, city, state, country, continent, and/or the world, and may generate sensor data using any number of sensors—e.g., LiDAR sensors 864, RADAR sensors 860, cameras 868, 870, 872, 874, 898, etc., inertial measurement unit (IMU) sensors 866, ultrasonic sensors 862, microphones 896, speed sensors 844, steering sensors 840, GNSS sensors 858, etc.—during the drives. Furthermore, in an embodiment, each individual vehicle 800 may generate the sensor data may use the sensor data for mapstream generation corresponding to the particular drive of the vehicle 800. For example, the mapstreams 120 generated to correspond to different drives from a single vehicle 800 and the drives from any number of other vehicles 800 may be used in map 102 creation, as described in more detail herein.

In various embodiments, as a result of a plurality of mapstreams 120 being used to generate the map data for any particular road segment, the individual mapstreams 120 from each drive may not be required to be as high-precision or high-fidelity as in conventional systems. For example, conventional systems use survey vehicles equipped with sensor types that are expensive and thus not desirable for installation in consumer vehicles (e.g., because the cost of the vehicles would increase) and where a particular drive includes a lot of dynamic or transitory factors such as, without limitation, traffic, construction artifacts, debris, occlusions, inclement weather effects, transitory hardware faults, or other sources of sensor data quality concern, the single drive may not yield data that is suitable for generating an accurate map for localization. In addition, as road conditions change, and due to the low number of survey vehicles available, the maps may not be updated as quickly—e.g., the maps are not updated until another survey vehicle traverses the same route.

For example, in contrast with systems of the present disclosure, by leveraging consumer vehicles with lower cost sensors, any number of mapstreams 120 from any number of drives may be used to generate the map data more quickly and more frequently. As a result, in various embodiments, individual mapstreams 120 from drives where occlusions or other quality concerns were present may be relied on to a lesser extent, and the mapstreams 120 from the higher quality sensor data may be relied on more heavily. In addition, in various embodiments, as the road structure, layout, conditions, surroundings, and/or other information change, health checking or monitoring may be performed to update the map data more quickly—e.g., in real-time or substantially real-time. For example, the real-time verification 106 component process sensor data and compares the sensor data to the map (e.g., using one or more perception systems) to verify one or more components of the map 102.

In some embodiments, there may be different options and requirements on or from downstream systems (e.g., the system may determine how much validation is required). For example, in server-side validation, maps (e.g., map 102), map data, and/or portions thereof may be validated while creating them in the cloud. In another example, in client-side validation, maps, map data, and/or portions thereof may be tested by the ego-machine before driving. For example, a car map manager 114 may obtain the map 102 and determine one or more regions of the map 102 to validate. In real-time verification examples (e.g., where the ego-machine includes the real-time verification 106 component), maps, map data, and/or portions thereof may be validated as a user drives (e.g., compared to perception). In various embodiments, the system (e.g., the server computer systems and ego-machines) may provide real-time (e.g., contemporaneously or near contemporaneously with a drive) verification of the map 102. In such embodiments, localization health data and map health may be generated for each drive.

In various embodiments, the system provides server-side validation (e.g., as executed by the map creation and cross-validation 116 component) and real-time verification 106 of the map 102. In such embodiments, the system determines mapstreams 120 to use for map 102 creation and/or validation. In addition, in various examples, the system determines to tests to execute for mapstreams 120 against a map 102 either using localization health, map health, and/or alternate mechanisms. In yet other embodiments, the system provides server-side validation, client-side validation, and real-time verification 106. In such embodiments, testing of updates to the map 102 may be performed without interfering with a user of the ego-machine and map validity information may be stored locally (e.g., by the ego-machine and/or within the map data in the local 112 data store). In yet other embodiments, the ego-machine may perform validation and real-time verification.

Additionally, in some embodiments, the system may consider whether to upload telemetry data (e.g., localization health data, map health data, validation data, invalidation data, etc.) and what to do with it. In an embodiment, map health data is used locally to make determinations related to operation of the ego-machine. Such embodiments enable utilization of localization health data and/or map health data. For example, one or more areas of the map 102 can be invalidated without waiting for server round tripping (e.g., by the local invalidation of map regions 108 component). In another example, this enables operation based at least in part on local route information for cases that need client validation. In other embodiment, map health data is provided (e.g., transmitted over a network) and maintained by one or more server computer systems operating a service (e.g., server-side). For example, ego-machines generate map health data during operation and provide the map health data associated with road segments or other portions of the map 102 to server computer systems. In such embodiments, the server computer systems may aggregate health data and/or health metrics associated with the map 102. In addition, in various embodiments, the server computer systems can provide updates to the map 102 in response to health data obtained from one or more ego-machines. In this manner, a plurality of ego-machines, for example, can be used to improve the map 102.

In some embodiments, security threat modeling is performed to determine intentional and/or unintentional telemetry data that may impact safety. In some embodiments, the scope of validation and/or invalidation may include several classes and/or types of issues associated with the map 102. For example, the classes may include a first class "Cannot localize at all," which may mark a whole road segment as unhealthy (e.g., in operable for one or more functions of the ego-machine such as navigation, route planning, autonomous driving, etc.); a second class "Can localize, but some landmarks (lane dividers, signs, poles) are missing," which may be flagged per-element (e.g., the ego-machine detected a road sign that is not included in one or more layers of the map 102); and a third class "New object, not accounted for by the map," which may be flagged per-segment (e.g., the ego-machine detected a variation in the road pattern different from the map 102).

In some embodiments, the system (e.g., the one or more server computer systems, the ego-machine, or a combination) may determine an amount of validation to perform (e.g., frequency, portions of the map 102, number of validating ego-machines, scope of validation, etc.). In one example, validation of the map 102 is performed at a tile-level (e.g., a 2 kilometer by 2 kilometer portion of the map 102). In this example, tiles within the map are indicated as valid or invalid based at least in part on a result of a localization health check and/or a map health check, which may include aggregation of mapstreams 120 (e.g., the localization health check and/or a map health check is performed by a mapstream and health aggregator 118). In some embodiments, tile-level validation may require all roads within the tile to be validates and, in addition, may result in an entire tile being invalidated as a result of a traffic light or other feature being invalidated.

In other embodiments, validation of the map 102 is performed at a road segment-level (e.g., 50 meter portions of roads included in the map 102) and individual road segments are marked as valid or invalid based at least in part on a result of a localization health check and/or a map health check as described in the present disclosure. In some examples, road segment-level validation can be used to distinguish between map layers of different senor modalities (e.g., RADAR and/or camera). In various embodiments, road segment-level validation may prevent the system from generating determinations (e.g., statements) lane dividers and/or other lane information as a result of the ego-machine not having information associated with the feature (e.g., the ego-machine is unable to obtain information about lanes further away). In yet other embodiments, road segment-level validation can include validation (or invalidation) of specific layers of the map 102. For example, as a result of a localization health check and/or a map health check, a camera layer of the map 102 and/or a road sign layer of the map 102 may be invalidated. In various embodiments, individual elements of the map 102 may be validated. For example, traffic lights, road segments, tiles, road patterns, or any other data included in the map 102 can be validated individually and/or as a result of features within the element being validated (e.g., a tile can be valid as a result of all features within the tile being validated).

The map 102 as described herein may include any data structure and/or type. However, in some embodiments, the map 102 may include a map manifest that may provide a high level container for the map 102. In some embodiments, map 102- or individual tiles, road segments within the tiles, and/or layers of the road segments—may each be identified by a universally unique identifier (UUID). In some embodiments, the data in the map 102 may be immutable and never change. For example, later versions or updates to the map 102 and/or map components may be published with a new UUID. In various embodiments, the car map manager 114 obtains the map manifest and determines components of the map to download, validate, and/or verify.

In some embodiments, the map manifest for the map 102 may define one or more tiles that may be stored in a tile cache 110. A tile may represent a container for a portion of map data that corresponds to a geographic region (e.g., one square kilometer) of the map. In one example, the one or more tiles may be designed to be downloaded as a unit, or may be designed such that individual road segments within the tile may be downloaded. For example, a road segment within a tile may represent a portion of a roadway (e.g., 50 meters), and each tile may include a plurality of road segments defined therein—e.g., each of the road segments within the tile geographic region may be included within the tile. In an embodiment, by storing the map data in tiles, and then as road segments within the tiles, map data may be more easily searchable. For example, instead of searching an entire map manifest, a listing of tile locations may be used to determine a tile corresponding to a current location of the ego-machine, and then a listing of road segments within the tile may be used to determine which road segments correspond to the current location of the ego-machine. As a result, in various embodiments, the tiered structure for the map 102 may allow for easier access to the desired portions of the map for use by the ego-machine.

In an embodiment, layer data may be stored in association with each road segment, such that each road segment may include a corresponding layer for each layer type that the map 102 represents. As such, for example, for road segment A, there may be a camera localization layer A, a RADAR localization layer A, a lane graph layer A, a lane channel layer A, a junctions layer A, and so on, and for road segment B, there may be a camera localization layer B, a RADAR localization layer B, a lane graph layer B, a lane channel layer B, a junctions layer B, and so on. In one example, if a developer wants to edit layer data for a road segment, the developer may select the road segment and be provided with all the layers associated with the road segment, which allows the developer to edit any layer of the road segment. In addition, in an embodiment, by segmenting the map 102 with tiles, then road segments, and then layers within road segments, the map 102 may be updated, downloaded, and or used (e.g., for driving, training of perception systems, etc.) at a more granular level, without requiring downloads, updates, or use of portions or segments of the map 102 that are not relevant, supported, or needed for a given task.

In some embodiments, a map layer may represent a class of data on the map 102. For example, these map layers may be selectively downloaded to allow a client to only download relevant data to the ego-machine. In an embodiment, a map layer may be made up of a core layer and one more map feature layers, the core layer may define a graph structure of the map—such as a graph of road lanes and the map feature layer(s) may include features such as traffic signs, junctions, training layers (e.g., for generating ground truth data for training machine learning models, deep neural networks (DNNs), and/or the like), and other types of feature layers. Individual map feature layers may be optionally/selectively downloaded as needed in various embodiments. For example, a user may optionally download a 'traffic_signs' layer. In some embodiments, layers may also be used to augment existing data, such as a junctions layer which may include rules for navigating intersections. Advantageously, the level of detail/granularity of the map 102 may be scaled up or down based on the needs of the system.

In some embodiments, the layers may be further classified as being training layers—such as a map data layer used for training a deep neural network (DNN) model—and/or driving layers that may be used to inform an autonomous driving system of the ego-machine. For example, training layers may be used to help train underlying perception of the ego-machine. The training layers may be automatically generated, and/or may be human labeled. For example, a human labeler may label information in the HD map training layers that may be used to generate training data for any type of sensor modality. As a non-limiting example, lane marking and/or road boundary layers may be used as training layers, where lane markings and/or road boundaries from the HD map training layers may be used to generate ground truth data for an image-based DNN that processes images to compute locations of lane lines and/or road boundary lines. In some embodiments, as described herein, the lane markings layer (e.g., including lane line types, locations, etc.) may not be used for driving, and may only be used for training, while a lane channel layer may be used for driving. For example, the lane channel layer may include continuous unbroken boundaries of each lane that may be used for guiding the ego-machine along the roadway. In some embodiments, the lane markings layer may be used to aid in generating the lane channel layers, but the lane marking layers may be relied upon for driving while the lane channel layers may be relied upon for driving. Moreover, in some embodiments, one or more layers may be classified as both a training layer and a driving layer.

In some embodiments, layers may be identified by a unique string layer name. For example, layer names may identify the layer with names such as 'core', 'junctions' and/or 'images_radar_detections'. Accordingly, references to a layer may be made by the layer's unique layer name.

In some embodiments, a data compatibility contract may be defined per layer name such that a payload for each layer may be designed to be backwards and forwards compatible. For example, if change to a data format will break backwards and forward compatibility, a new layer with a new layer name may be defined. For example, if a new format is required for the data inside a 'traffic_signs' layer that would be incompatible with existing clients of the 'traffic_signs' layer, a new layer may be created instead (e.g. 'traffic_signs2'). In further embodiments, optional additional data may be added to one or more layers provided it is not required for legacy consumers to read the data.

In some embodiments, one or more layers may have layer dependencies and a layer that has a dependency may not be understood by the system unless one or more required dependent layers are also present and/or provided to the system. For example, each layer may depend on the 'core' layer and require that the 'core' layer be provided to the system in order to use any additional layers. In some embodiments, layer dependencies may be configured into a dependency graph where layers may reference sub-layers that may be required in order to use a particular layer. If a particular layer is selected, the system may determine which sub-layers are needed and provide each of the needed sub-layers, along with the selected layer, to the ego-machine to enable the ego-machine to understand the data of the selected layer. For example, if the junctions layer is selected, the system may determine that a lanes layer is required to describe the geometry of the roadway in order to apply roadway rules from the junctions layer.

In some embodiments, the system may restrict new layer dependencies from being added to a layer. This may be disallowed because past clients may not be able to understand the new dependent layer. However, layer dependencies may be removed if data no longer references the target layer. In further embodiments, the system may prohibit circular dependencies, such that a layer that is depended on cannot then depend on the layer(s) that depend on it—e.g., if a circular dependency exists, this may be evidence that two layers should be collapsed into one. The layer name and layer dependencies may be defined by the system in a layer descriptor.

In some embodiments, the system may enforce layer design principles when designing new layers. For example, the system may allow for the creation of a new layer in examples where a portion of data is desired by only specific consumers. In such examples, a new layer may not enforce restrictions on a layer below the new layer, as layer designers may prefer ease of encoding correctly, over encoding compactly. In addition, layers may be designed with size optimizations based on calculations and benchmarking, rather than premature optimization. In some examples, a read contract for a layer must never break and breaking changes must be made by creating a new layer and deprecating the old layer.

In some embodiments, a map manifest may be stored in a file format—such as a JSON file—that describes a tile layout and layer layout of a map. The manifest may operate as a container for data payloads and may not prescribe any detail of a layer's payload format. The format for layers may be described in a 'Layer Format' section of the manifest.

In some embodiments, the manifest file may contain a UUID for a map ('id') and a list of tiles ('tiles'). Each of the tiles of the list of tiles may contain a UUID for the tile ('id'), a quadrilateral for a geographic region the tile represents ('region'), a list of layers within the tile ('layers'), and/or other necessary data for the tiles. One or more layers in the layer list may contain a unique name of the layer(s) ('name'), a 'Link' object that may describe a URL for the layer payload. In some embodiments, the layer payload may be raw layer data, for example, an XML file for a legacy XML layer and/or a layer manifest when layer contains multiple payloads.

In some embodiments, the layer manifest file may contain a UUID of the tile that contains it ('tile id'), a unique name of the layer ('name'), a list of payload items ('items'), and/or other necessary data for the layer manifest. The payload items may contain a name for the payload ('name'), a link object that may describe where to download the payload ('link'), metadata regarding the payload ('meta'), and/or other payload information.

In some embodiments, the disk representation may include each per-road segment protobuffer and/or flatbuffers payload being stored in a map directory (e.g., map_directory/[layer name]/[road segment id].nvmap). For example, the use of flatbuffers may allow for each layer corresponding to each road segment to be downloaded individually and directly to the ego-machine without deserialization or parsing. As opposed to conventional HD maps where large map files are downloaded, deserialized, and parsed in order to generate map data in a digestible format for the ego-machine, the map 102, in an embodiment, includes individual flatbuffer payloads for each layer within each road segment identified using UUIDs, for example. As such, when downloading the desired layer(s) for a given (e.g., current) road segment, the ego-machine may request the data corresponding to the layer within the road segment and receive the flatbuffer payload that may be used directly without deserialization, parsing, and/or the like. For example, the entire payload from the flatbuffer may be downloaded directly to memory—e.g., into the tile cache 110—and then discarded once the road segment has been traversed. In some examples, the tile cache 110 may store data for a current road segment and one or more surrounding road segments, and may discard road segment data once the road segment has been traversed, or is not going to be traversed.

In some embodiments, a core layer may contain non-image features and may be replaced with other layers specified. A schema—such as a flatbuffers schema—may be used to define each road segment of a layer. In some embodiments, one or more serialization formats (e.g., flat-buffers or Protocol Buffers) may be used to access and provide map layers directly to the system and without the need to deserialize and parse through a map file. For example, based on receiving a selection for a particular layer, the system may directly access an on disk represen-tation of the selected layer based on a corresponding UUID and load the selected layer into memory. Additionally, based on a determined global coordinate, the system may deter-mine which tile and/or road segment the ego-machine is in and access only the selected layer(s)—and any dependent layers—from the tile(s) and/or road segments corresponding to the location of the ego-machine.

In some embodiments, a map directory may contain several files. For example, there may be a directory called 'core_v1' with files of the format "[id].nvmap" where each file may be decoded using a layer table—such as a 'CoreV1Layer' table. The directory/layer may contain ele-ments such as, Road Segments, Lanes, Lane Groups, Lane Divider Groups, Lane Dividers, and/or Features, among others.

In some embodiments, each payload of, for example, core_v1, may represent one or more road segments. The road segments may define a local coordinate system for all other elements. These elements may be defined by a UUID, a World Geodetic System (WGS84) global position, and/or connections (e.g., including relative local transformations) to other Road Segments. In some embodiments, road seg-ments may be connected to nearby segments, and any two road segments that a vehicle can travel between may be connected. These road segment connections may include a transformation from a connected coordinate system into a local coordinate system. In some examples, a direction of the connections may not be relevant, such that the connec-tions between road segments and/or the transformations there between may not be related to the travel direction of an ego-machine.

Figure 2:
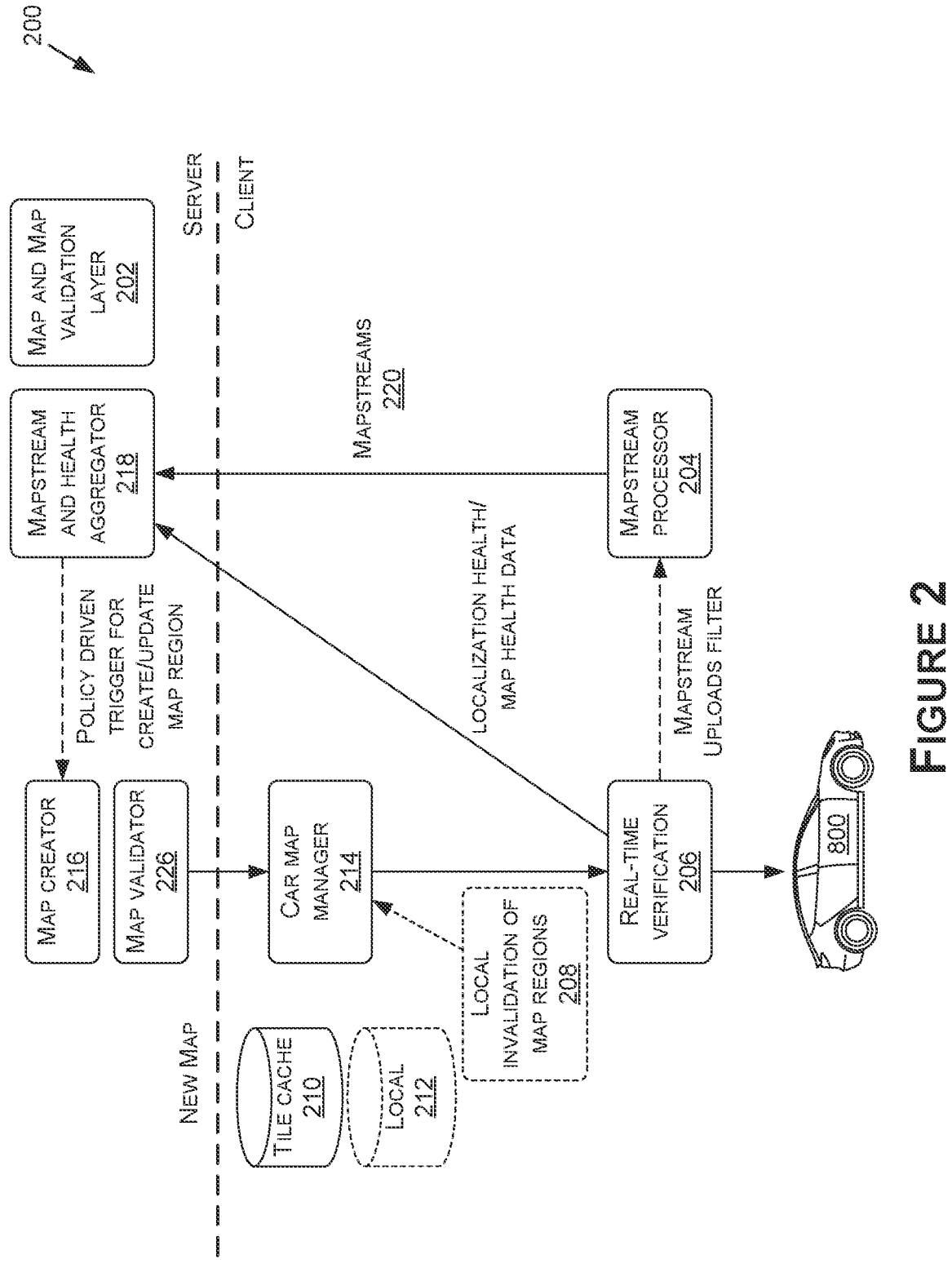
FIG. 2 illustrates an example end-to-end design configuration with incremental server-side validation, in accordance with some embodiments of the current disclosure.

FIG. 2 illustrates an example 200 of end-to-end design configuration with incremental server-side validation (e.g., shadow mode in the cloud), in accordance with some embodiments of the current disclosure. In various embodi-ments, the component in FIG. 2 include similar components as FIG. 1, various differences between FIG. 1 and FIG. 2 include that (1) the map can have a "validation layer" 202 for road segments that indicate whether it is suitable for driving; (2) as more mapstreams 220 are uploaded, these may be tested by one or more server computer systems and upgraded and/or used by the map creator 216 to generate data to be used by the ego-machine; (3) the configuration allow for maps to be built with an asymmetric number of mapstreams 120 obtained by the one or more server computer systems and make a decision whether to enable news maps to be built based at least in part on new drives or existing drives; and (4) the configuration decouples creation and validation workflows (e.g., workflows executed by the map creator 216 and map validator 226) on the one or more server computer systems.

In some embodiments, detailed validation states can be tracked at the road segment scope or the <road segment-.layer> scope or an even smaller scope (on the one or more server computer systems). In various embodiments, the system illustrated in example 200 supports features to limit driving based on operational design domains (ODDs)—such as features to determine when, where, and under what conditions an ego-machine can safely activate automated driving functions. In some embodiments, the system may block off certain areas of the map from the server side to prevent these areas from being drivable. In some examples, validation states for map driving may include not allowed as a result of ODD; not allowed as a result of an override (e.g., user and/or policy driven override) stored and/or generate by the ego-machine or server; sanity pass only; localization health validated; localization health validated and map health validated; and/or human validated.

Figure 3:
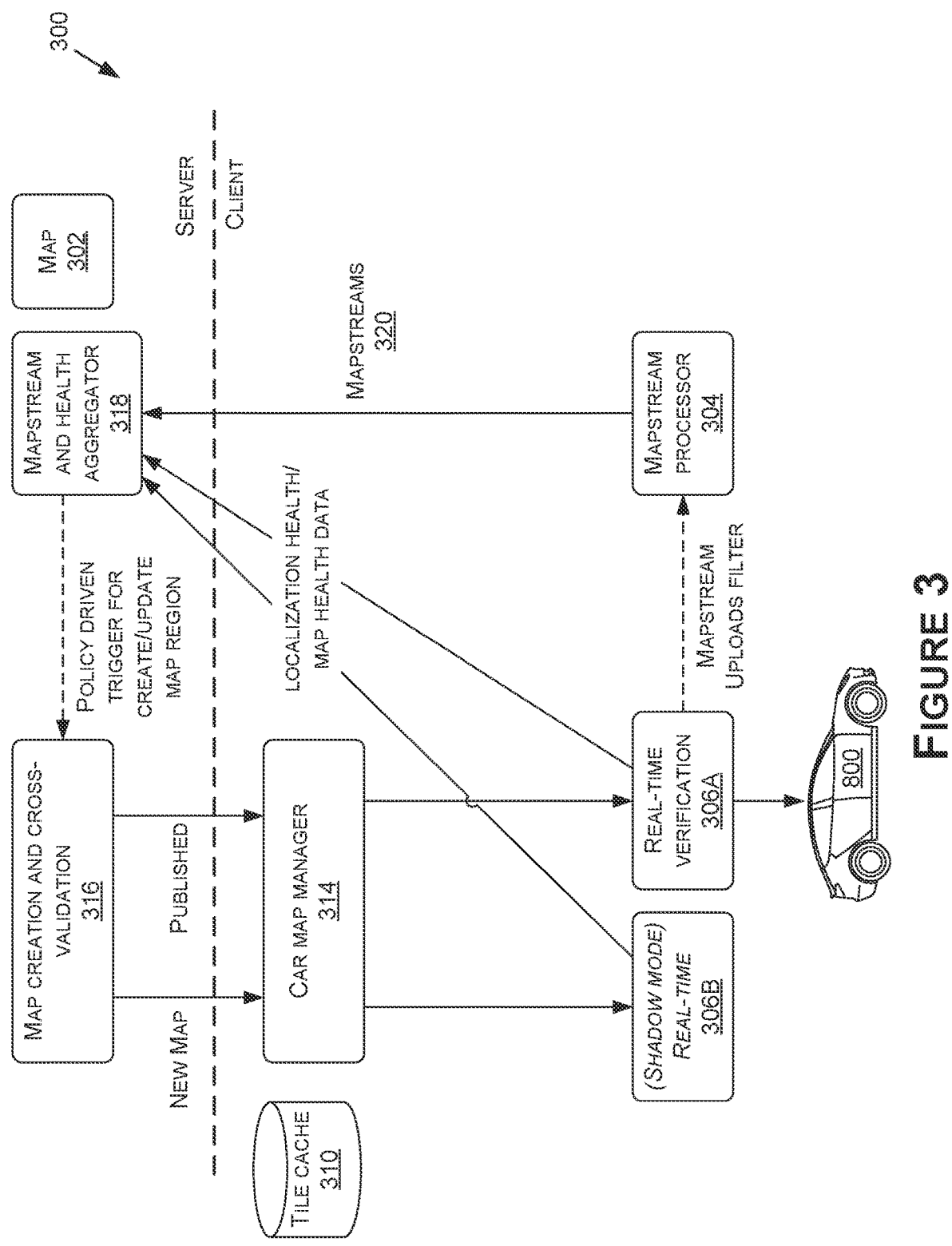
FIG. 3 illustrates an example end-to-end design configuration for a map health monitoring system, in accordance with some embodiments of the present disclosure.

FIG. 3 illustrates an example 300 of an alternative end-to-end design configuration, in accordance with some embodiments of the current disclosure. In some embodi-ments, server-side validation of a map 302 may be based at least in part on cross-validation (e.g., as executed by the map creation and cross-validation 316 component). For example, as executed by the server, the mapstream and health aggre-gator 318 may aggregate mapstreams 320 and map health data per cell. Furthermore, in various embodiments, based at least in part on policy triggers (e.g., a sufficient number of mapstreams 320 have been obtained for creation and/or validation, map health triggers, localization health triggers, or other triggers), the system may execute or cause to be executed a map creation and/or update workflow based at least in part on mapstream data and/or map health data. In an embodiment, maps may be considered partially validated on the one or more server computer systems and may require extra validation in the ego-machine before publishing. For example, to ensure that there is no user-discernible gap in driving experience, the system may support a "shadow mode" 306B to allow the system to validate new maps while still driving based at least in part on old maps. In various embodiments, data generated during operation of the shadow mode 306B (e.g., verification data, validation data, telemetry data, etc.) may be uploaded to the one or more server computer systems. In some embodiments, the system may allow the ego-machine to collect local validation data in the ego-machine based at least in part on multiple drives. In one example, if real-time verification 306A fails, the system may also trigger mapstream collections (e.g., chunks of data starting from when a verification failed). In one or more embodiments, either (or both) of the shadow mode 306B/real-time verification 306A may dictate that no new mapstreams are uploaded. Real-time verification 306A data may always be uploaded (e.g., attached to a map version). If real-time verification fails 306A, the system may use a policy trigger to locally invalidate regions of maps.

In some embodiments, a use case may include when (1) an ego-machine obtains a "test" map, an update to a map, and/or a new version of a map after a number of drives and (a) a "test" map is provided to the shadow mode 306B which does further drives to validate these maps; (b) no new mapstreams will be uploaded for this region while map testing (e.g., verification) may be in progress; (c) based on shadow mode telemetry that gets uploaded, a new "published" map may be generate (d) the system may consider variations where validation on a "test map" may be running continuously, there may be a minimum or maximum time per ego-machine, or for the duration while a "test" map is being testing. In other embodiments, a use case includes (2) an ego-machine gets an updated map after a number of drives and (a) the ego-machine may be driving on a previously "published" map (b) and a "test" map may now be available, (c) shadow mode 306A telemetry data may indicate no new mapstreams may be needed and the system does not upload mapstreams 320 and (d) the system may obtain a new "published" map. In other embodiments, a use case includes (3) the ego-machine drives N number of routes on a previous map, obtains a new map with only M validated routes and the new map has fewer validated routes (e.g., M<N). In other embodiments, a use case includes (4) the ego-machine detects a change in the road a number of times and (a) telemetry data may be uploaded to the one or more servers, (b) mapstreams 320 may be uploaded for this section of the road, (c) maps may be triggered based on telemetry data which produce a new map, (d) the map may then be updated in the ego-machine (e.g., based at least in part on the new map), and (e) a section of the current map may be locally invalidated for driving based on continuous detection of issues. In an embodiment, local invalidation layer information may be removed away with map updates. For example, if a map is updated and any local validation layer exists, the local validation layer may be invalid; and (5) the ego-machine may have an old map manifest and be prevented from operating. In such examples, a map manifest is required to be new, but tiles could be old if an area doesn't change.

In some embodiments, certain data may be required to be valid in the map. In one example, server side validation may be comprehensive and client side validation may be limited to a subset. In an embodiment, a signal is generated to indicate if mapstreams 320 are uploaded. In some embodiments, the system may create maps from mapstreams 320 and validate them using the one or more server computer systems. In various embodiments, a plurality of maps are generated from the mapstreams 320 and compared. In yet other embodiments, the one or more server computer system validate the map 302 based at least in part on the mapstreams 320. For example, the mapstreams 320 may include localization health data to enable one or more server computer systems to validate the map 302. As such, in various embodiments, the ego-machine may generate confidence values (e.g., based at least in part on sensor data obtained from sensors of one or more modalities) and provide the confidence values to the one or more server computer systems. In yet other embodiments, the one or more server computer systems may validate the map data incrementally as mapstreams 320 are obtained.

In some embodiments, ground truth (GT) maps may be validated by executing localization of some selected sequences by at least causing the one or more server computer system to perform localization checks. For example, the system may do the following: (1) run camera localization against a reference trajectory for a set of timestamps; (2) run radar localization against the reference trajectory for a set of timestamps; (3) compare camera and radar localization results for the same set of timestamps, which may be run within the bounds of the map. These localization results may then be aggregated across sequences to produce an aggregated result in various embodiments. For sequences and aggregates, in an embodiment, the system may produce histograms. For example, if these histograms are within reasonable bias, these may be accepted as passing a validation check.

In some embodiments, the system may auto-select sequences for validation. Further, in an example, the system may generate a visualization indication regions in the map where the system determines localization issues across the sequence on the map per-frame. In an embodiment, localization results may be based at least in part on a local layout. Further, in various embodiments, the system may aggregate localization results per road segment (e.g., root of the local layout), which may be helpful for debugging and troubleshooting map sections that have possible localization issues.

In some embodiments, ground truth maps may be validated by running map comparison of selected sequences by at least causing the one or more server computer systems to execute map health checks. In an embodiment, after localization of these sequences, the system may do an element-by-element comparison of map 302 and perception (e.g., data generated by the ego-machine). For example, the system may compare various map elements—such as lanes, lane dividers, traffic signs and lights, among others.

In some embodiments, for every sequence and/or for every frame, the system may compute map comparison results per map element "edge" within both a map of a three dimensional (3D) region of interest (e.g., some box around the map pose) and a perception two dimensional (2D) DNN region of interest (e.g., data generated as a result of executing the DNN). For example, for lane dividers, the system may get an "edge" between two successive vertices. In another example, for traffic signs/lights, the system may get an "edge" between two successive vertices. The system may use distance transform between perception and a map element "edge," in accordance with an embodiment. In some embodiments, it may be advantageous to use an "edge" instead of a vertex because the system may get a more average output of the distance transform. In some examples, the results may be aggregated on map element "edges," may be executed within the bounds of the map 302, and may then be aggregated across sequences to produce an aggregated result.

In some embodiments, a localization component may run the comparisons to produce a JSON file containing the following information per frame with the following: (1) map element "edge" (lane divider identification information and two vertices, or traffic sign/light identification information with two vertices); and (2) distance in 3D (2D computed from distance transform projected to a Z distance).

In some embodiments, a map component may (1) aggregate across all frames for a particular sequence to get a heatmap per map element "edge"; (2) aggregate across multiple sequences to get a heatmap per map element "edge"; (3) visualize this heatmap (both per-sequence and aggregated) in an editor; and (4) build sanity checks based at least in part on this heatmap. In some embodiments, the system may auto-select sequences for map validation for map health checks.

In some embodiments, the map 302 may contain multiple layers of information, and may be used by many different modules. For example, a primary consumer may include: localization (e.g., where map content is consumed by the localization module), lane planner, lane graph fusion, wait conditions fusion, static obstacles fusion, parking fusion, and/or behavior planner. In various embodiments, the information may be finally consumed via a world model.

In some embodiments, the map may be distributed to ego-machines in the form of tiles. As described above, in an embodiment, the ego-machine may cache tiles (e.g., in the tile cache 310) based on where the ego-machine is expected to drive. For example, the map manifest may be a descriptor of the map 302 and may enable multiple tiles to be accessible via this descriptor. In various embodiments, "map manifests" may refer to tiles and layers within these tiles. In an embodiment, a layer blob may be downloaded using links provided in the manifest and a per-road segment blob may be downloaded for each layer.

In some embodiments, localization may produce confidence values per sensor. For example, localization may not be able to include information indicating a benefit of a lane/feature scope, but it may be used to determine the accuracy of a local layout. In some embodiments, one or more of the outputs from camera localization, RADAR localization, and camera and RADAR localization fusion may produce confidence values.

For example, some options to understand whether localization is accurate may include (1) camera localization is not confident for an area which may signal either poor map camera coverage, that the coverage does not match reality, or calibration may be bad, ego-motion may be bad. In such examples, it may be difficult to distinguish between poor coverage and/or to determine whether the map matches the physical location (e.g., this may signal either poor radar coverage or that the map does not match reality, or calibration may have failed, or other cases similar to camera calibration). In yet other examples, (3) camera and RADAR localization information does not agree when both are associated with sufficient confidence values. For example, if global ego-motion is associated with sufficient confidence values and a road segment origin is very far away, it may signal an inaccurately located road segment origin in the map 302.

Figure 4:
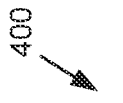
FIG. 4 illustrates an example of a chart of protection error (PE) vs protection level (PL), in accordance with some embodiments of the present disclosure.

With reference to FIG. 4, FIG. 4 includes an example 400 of a chart of protection error (PE) vs protection level (PL), in accordance with some embodiments. For example, the chart may indicate integrity failures with respect to localization and the resulting safety issues associated with the same. In one example, an integrity failure with respect to localization may be indicated when a lateral localization error is greater than 40 cm (alert limit, "AL") for more than 0.5 seconds (time to alert, "TTA"). In an embodiment, an integrity requirement may be that there is one integrity failure per 10,000 hours when the system is available. Furthermore, in various embodiments, an integrity risk may include the probability of an integrity failure when running localization without protection (PL). By adding a protection level, the system may meet the integrity requirement by trading away availability, in various embodiments. For example, the availability requirement may be that the system is available at least ninety-nine percent of the time.

In an embodiment, a KPI framework may be used with ground truth—as describe in greater detail below in connection with FIG. 5—and for each consumer AL and/or TTA, a number of hits for each bucket in the chart of FIG. 4 may be determined. In example, include hits in nominal operation area (e.g., PE<PL<AL) and the system unavailable area (e.g., AL<PE<PL). The metric used may include availability while meeting integrity requirement and/or integrity while meeting availability requirement.

Figure 5:
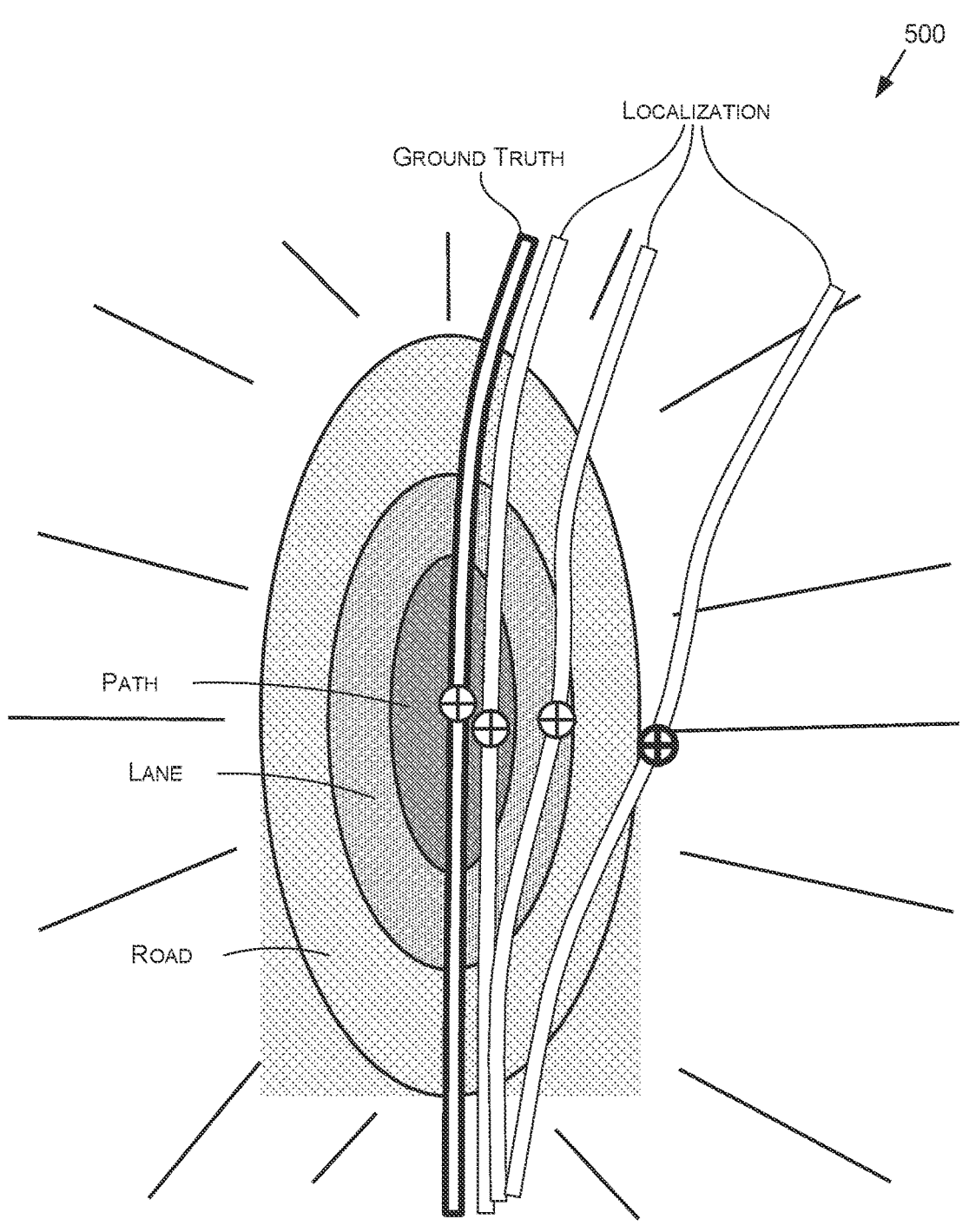
FIG. 5 illustrates an example of localization results which may be used for various operations, in accordance with some embodiments of the present disclosure.

With reference to FIG. 5, FIG. 5 illustrates an example 500 of localization results which may be used for various operations, such as path planning, lane assignment, road assignment/geofencing, and/or map registration, in accordance with some embodiments. In various embodiments, each consumer may have their own alert limit (AL), time to alert (TTA), integrity requirement, and/or availability requirement, as described herein. In such embodiments, the goal may be to design and implement the framework for how to compute a protection level (PL) for each consumer. For example, in FIG. 5, the alert ellipsoids (illustrated as shaded ellipses in FIG. 5) may correspond to using localization for path planning, lane assignment, and road assignment. In an embodiment, a size of an ellipsoid may indicate an amount of deviation allowed with respect to the particular operation that localization is used for prior to signaling an alert or a disagreement. For example, because two out of the three localization results may be accurate enough for path planning and/or lane assignment, the associated circles are illustrated as green—e.g., the predictions fall within the "no alert" zones of the ellipsoids. However, in such examples, the third localization result (e.g., furthest to the right) may not be accurate enough for localization with respect to path planning, lane assignment, and/or road assignment, so the associated circle is illustrated as red indicating an alert or disagreement.

In some embodiments related to payload confidence, the system and/or module thereof may be able to provide confidence values for individual elements of a map. This module may compare live perception (e.g., data generated by one or more models using sensor data) to a map, in embodiments, and may be able to provide (1) lane graph—e.g., graph lane piece by piece (between perception and map—compare channel type and other details). For example, the output may be an association and confidence per association. Overall lane graph confidence may also be provided, and may be provided in 2D/3D and/or as a top-down view comparison, in various embodiments. The module may also provide (2) signs and traffic lights—e.g., geometry may be the same, type and function of the sign is the same. In various examples, this may be provided in 2D/3D and/or in top-down depending on perception depth quality. The module, in various embodiments, may provide (3) road markings—e.g., geometry may be the same, type and function of the road markings are the same—and/or (4) wait lines—e.g., precision of wait lines.

In some embodiments, path safety may determine that multiple path inputs reliably agree at a given point in time to enable safe operation of certain features that depend on path safety at an Automotive Safety Integrity Level (ASIL) level as defined in ISO 26262 hereby incorporated by reference in its entirety. Other components may have similar safety architectures as may be required to ensure that content being fused from multiple sources agree to the related safety level that may be needed for that function (e.g., wait conditions). In various embodiments, map health data includes a determination whether the map, modelled as a combined sensor (e.g., a camera), may be suitable for use for any driving function for a given section of map that the ego-machine is driving on. In other embodiments, map health data includes a determination whether a map section should be used by a future ego-machine driving through a map section, and whether that map section should just be marked for recreation altogether.

In some embodiments, map health may take a comparator input to identify areas of the map that don't agree with other inputs. For example, the system may then aggregate that input and compare it against defined map health policies to determine if a section of map should be invalidated for use immediately at drive-time (e.g., in real-time). Further, in various embodiments, the system may send those aggregated signals to one or more server computer systems to invalidate map sections for use by other drivers.

In some embodiments, to make sure verification data can be used from previous drives, the system may maintain road segment identification information whenever the system performs a re-fuse operation. In some embodiments when the system gets a new map (e.g., version to) and the system performed some local verification on the previous map (e.g., version one), the local verification may not be useful anymore. In other embodiments, local verification may not be used for self-driving determination regardless of whether the system performed some local verification on version one. In other embodiments, the system may not switch maps (e.g., from version one to version two) if the version of the map does not have verification data for routes that may be needed by the system and the system will continue driving using a previous map version. For example, version two of the map may be used once local verification has been done in shadow mode. In other embodiments, the system may transfer local verification data from version one of the map to version two of the map so that the ego-machine continue operation. For example, the system may transfer local verification data such as adding lanes to existing road segments and changing road segments. Advantageously, the map may continue working as other layers will not have changed and the route's road segments will not have changed.

In some embodiments, the system may distinguish between missing elements v/s existing element that do not match reality. In an embodiment, the system may further triangulate lanes the system is not confident in to allow the system to "track" those for validation. This may be used for visual and/or automated debugging.

Figure 6:
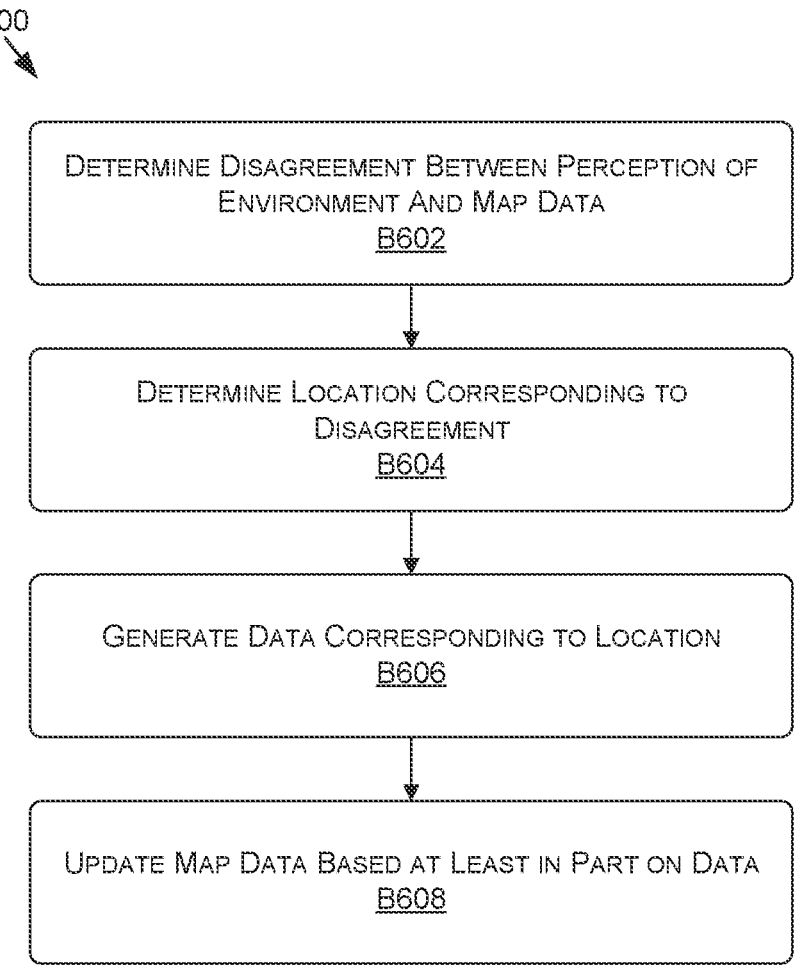
FIG. 6 illustrates a method for updating map data, in accordance with some embodiments of the present disclosure.
Figure 7:
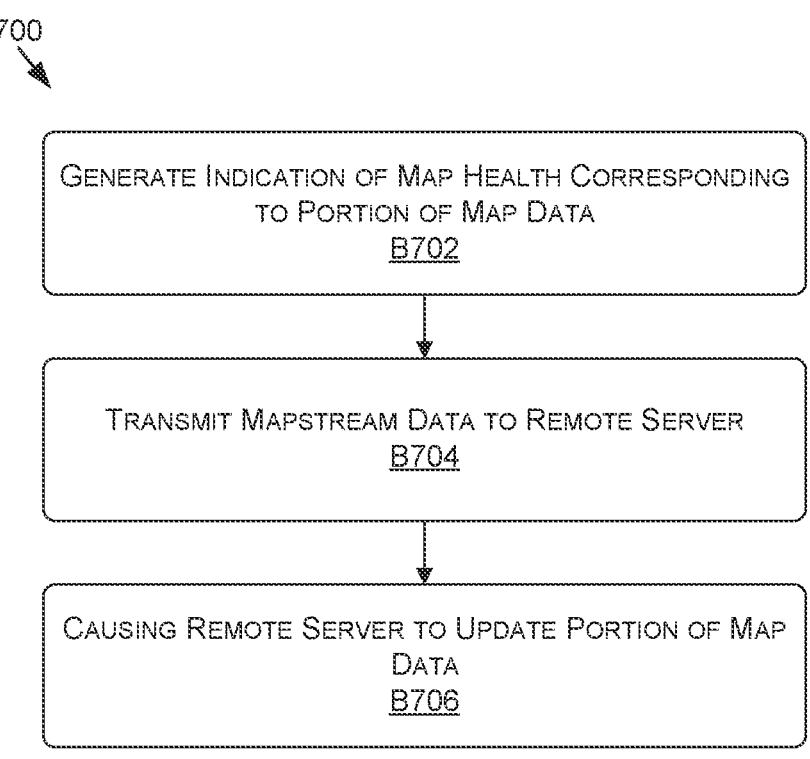
FIG. 7 illustrates a method for causing a remote server to update map data, in accordance with some embodiments of the present disclosure.

Now referring to FIGS. 6 and 7, each block of methods 600 and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 600 and 700 are described, by way of example, with respect to the map health monitoring system of FIGS. 1-3. However, these methods may additionally or alternatively be executed by any one system, or any combination of systems, including, but not limited to, those described herein.

FIG. 6 is a flow diagram showing a method 600 for updating map data, in accordance with some embodiments of the present disclosure. The method 600, at block B602, includes determining a disagreement between the perception of an environment and map data. For example, an ego-machine including one or more sensors that capture data corresponding to an environment of the ego-machine, and the sensor data is used (e.g., by one or more models) to generate data (e.g., a perception) associated with the environment. In such examples, this data is compared to map data to determine a disagreement.

At block B604, the system executing the method 600, determines a location corresponding to the disagreement. In various embodiments, a coordinate system is used to encode location information.

At block B606, the system executing the method 600, generates data corresponding to the location. For example, the ego-machine generates map health data and/or localization health data.

At block B608, the system executing the method 600, updates map data based at least in part the map health data and/or localization health data. For example, the ego-machine may provide mapstream data to one or more server computer systems, and the map data may be updated.

FIG. 7 is a flow diagram showing a method 700 for causing a remote server to update a portion of map data, in accordance with some embodiments of the present disclosure. The method 700, at block B702, includes generating an indication of map health corresponding to a portion of map data. As described above, in various embodiments, a disagreement between map data and perception of an environment may cause the system executing the method 700 to invalidate one or more portions of a map (e.g., tiles, road segments, etc.)

At block B704, the system executing the method 700, transmits mapstream data to the remote server (e.g., one or more server computer systems). As described above, mapstream data, for example, may be generated by an ego-machine during operation (e.g., one or more drives).

At block B706, the system executing the method 700, causes the remote server to update the portion of the map data. For example, in various embodiments, one or more policy trigger may indicate conditions for updating the map data.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation or digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 8A:
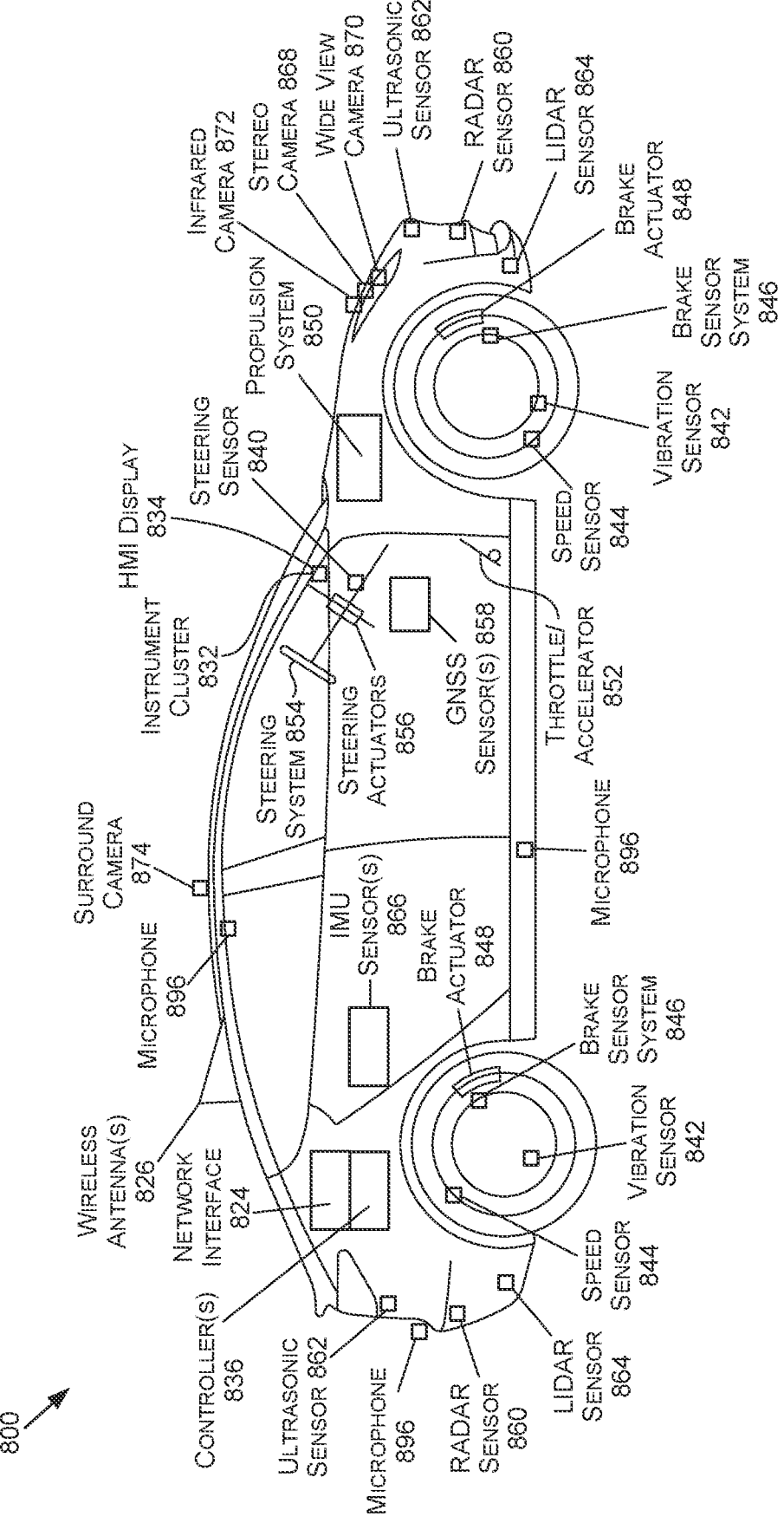
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of function-ality in accordance with one or more of Level 1-Level 5 of the autonomous driving levels. For example, the vehicle 800 may be capable of driver assistance (Level 1), partial auto-mation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assis-tive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and out-put operation commands (e.g., signals representing com-mands) to enable autonomous driving and/or to assist a human driver in driving the vehicle 800. The controller(s)

836 may include a first controller 836 for autonomous driving functions, a second controller 836 for functional safety functions, a third controller 836 for artificial intelli-gence functionality (e.g., computer vision), a fourth control-ler 836 for infotainment functionality, a fifth controller 836 for redundancy in emergency conditions, and/or other con-trollers. In some examples, a single controller 836 may handle two or more of the above functionalities, two or more controllers 836 may handle a single functionality, and/or any combination thereof.

The controller(s) 836 may provide the signals for con-trolling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Posi-tioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle veloc-ity, speed, time, map data (e.g., the HD map 822 of FIG. 8C), location data (e.g., the vehicle's 800 location, such as on a map), direction, location of other vehicles (e.g., an occu-pancy grid), information about objects and status of objects as perceived by the controller(s) 836, etc. For example, the HMI display 834 may display information about the pres-ence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area net-work(s), such as Bluetooth, Bluetooth LE, Z-Wave, ZigBee, etc., and/or low power wide-area network(s) (LPWANs), such as LoRaWAN, SigFox, etc.

Figure 8B:
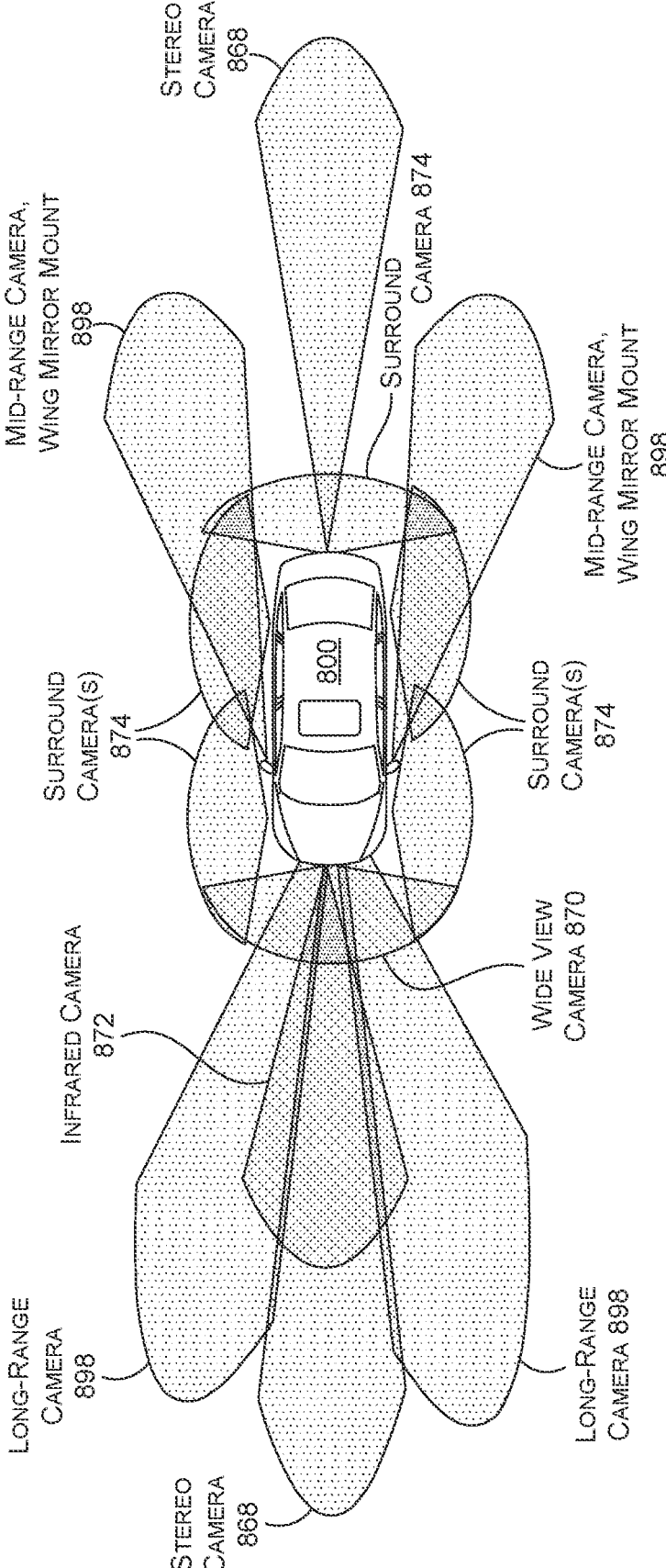
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present dis-closure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
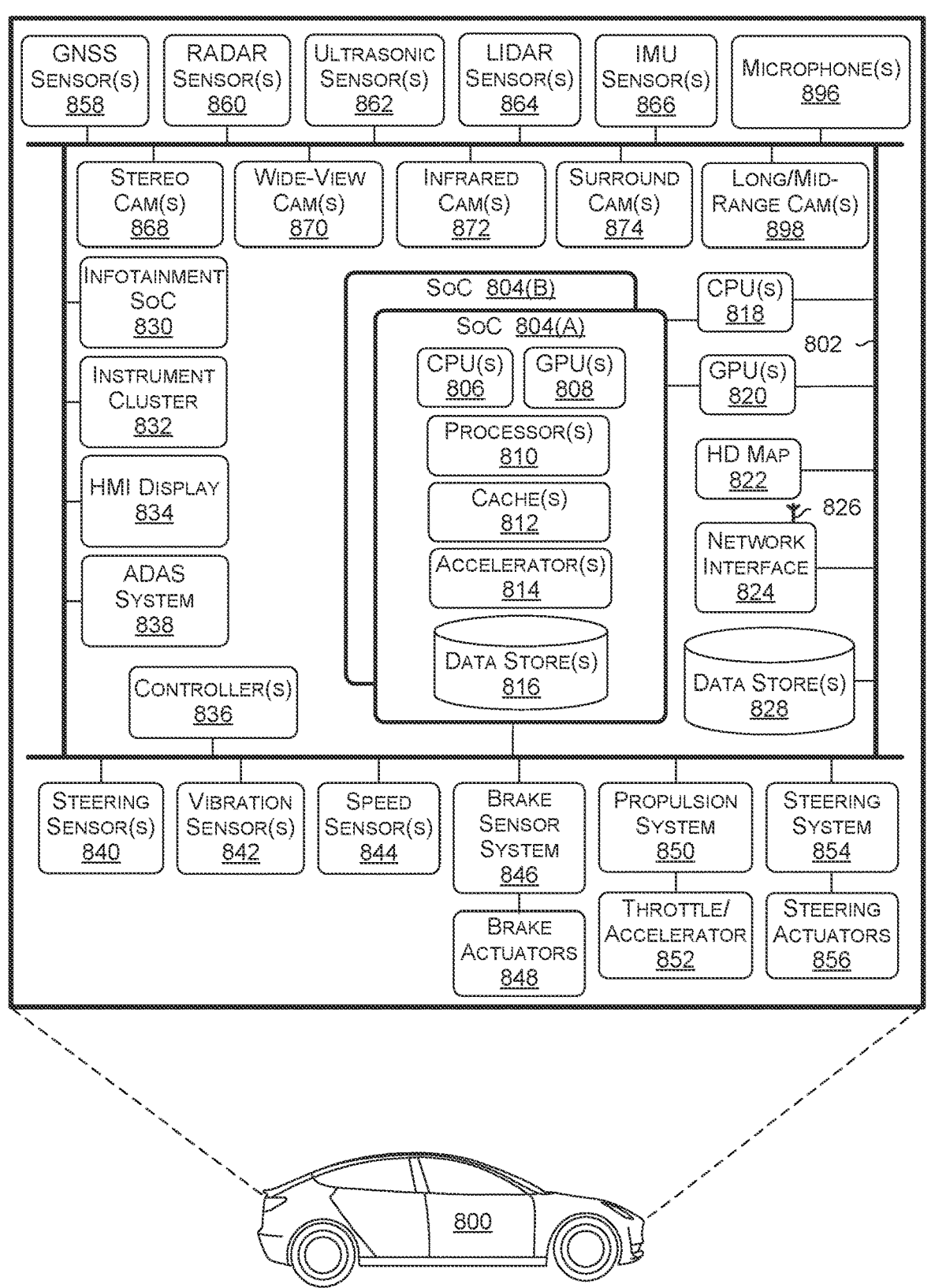
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIvMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK).

The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
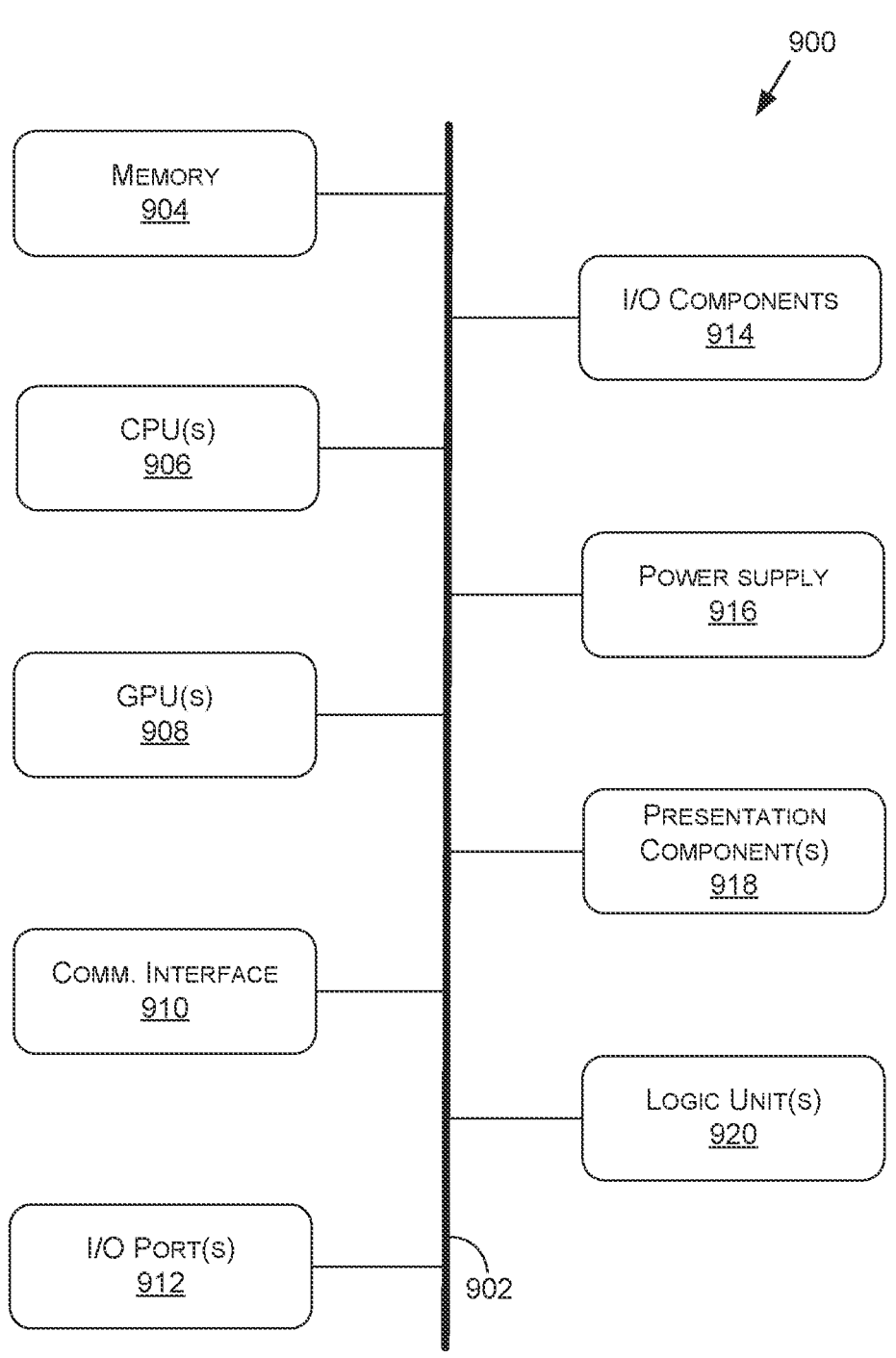
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
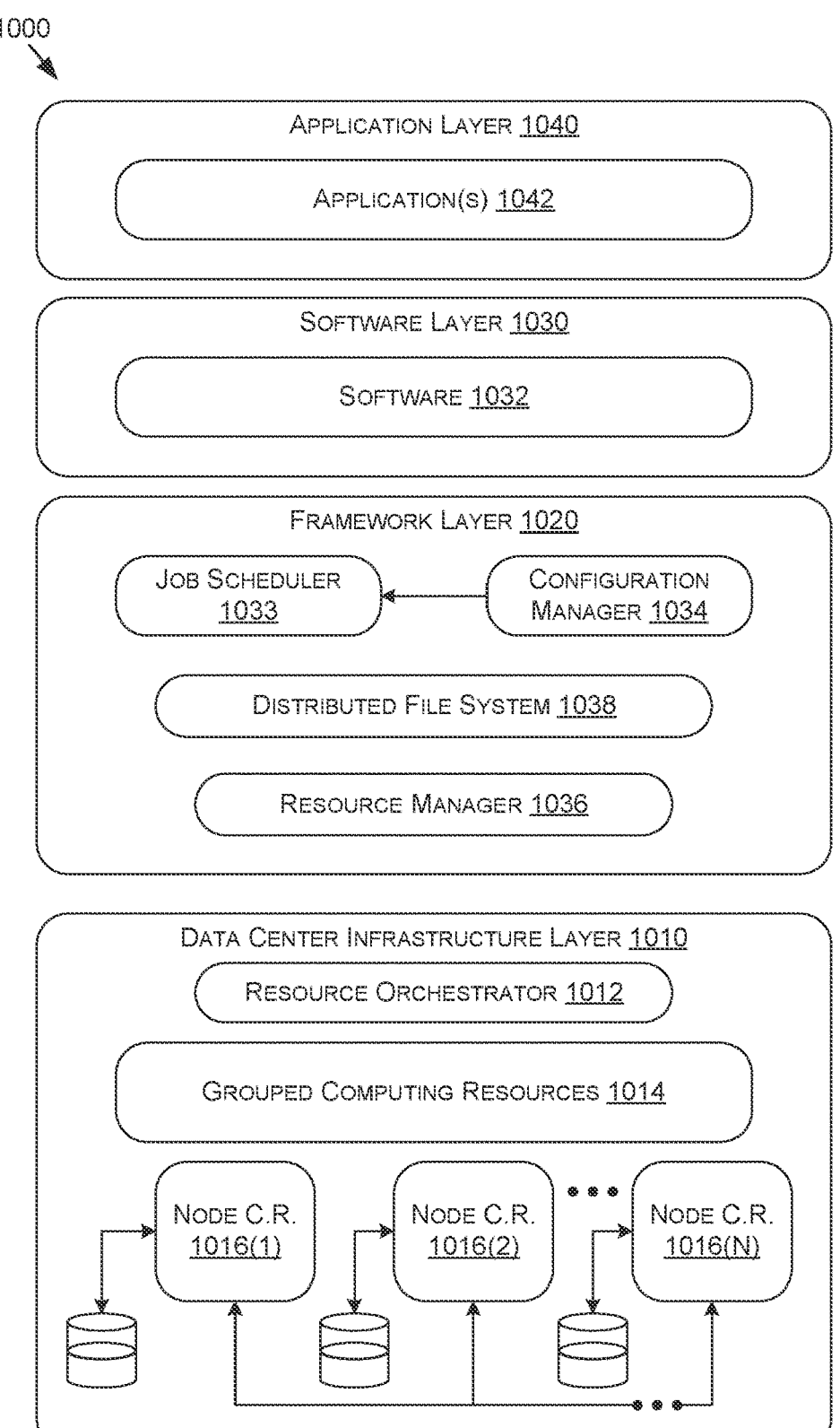
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s

1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
one or more circuits to:
  determine, for a road segment of an HD map, one or more misalignments between a first layer of a version of the HD map and a second layer of the version of the HD map that corresponds to a different class of data than the first layer;
  determine a location within the road segment that corresponds to the one or more misalignments;
  based at least on the one or more misalignments, transmit, over one or more first network communications to at least one vehicle, at least one indication that triggers the at least one vehicle to generate mapstream data corresponding to the location;
  convert, by at least one processor, the mapstream data into at least one map comprising at least one drive segment corresponding to the location;
  generate, by the at least one processor and using the at least one drive segment, a fused HD map representation of the drive segment; and
  transmit, over one or more second network communications to one or more vehicles, the fused HD map representation, the one or more second network communications causing the one or more vehicles to use the fused HD map representation of the drive segment in an updated version of the HD map to navigate an environment corresponding to the road segment.

2. The at least one processor of claim 1, wherein the one or more misalignments are determined based at least on:
  determining first localization information corresponding to a first localization performed using the first layer and first perception data;
  determining second localization information corresponding to a second localization performed using the second layer and second perception data; and
  determining the first localization information disagrees with the second localization information.

3. The at least one processor of claim 1, wherein the at least one drive segment includes a plurality of drive segments, the one or more circuits are to geometrically register drive segments of the plurality of drive segments to determine pose links between poses corresponding to drives used to generate the mapstream data, and the generating of the fused HD map representation is based at least on the pose links.

4. The at least one processor of claim 1, wherein the at least one drive segment includes a plurality of drive segments, the one or more circuits are to geometrically register drive segments of the plurality of drive segments to determine rotation and translation between frames corresponding to drives used to generate the mapstream data, and the generating of the fused HD map representation is based at least on the rotation and translation between the frames.

5. The at least one processor of claim 1, wherein the one or more first network communications trigger a plurality of vehicles to use on-board sensors to collect the mapstream data and upload the mapstream data to at least one server comprising the at least one processor.

6. The at least one processor of claim 1, wherein the mapstream data includes at least one of raw sensor data, pre-processed sensor data, perception data generated using one or more deep neural networks (DNNs), or data representative of a relative trajectory.

7. The at least one processor of claim 1, wherein the one or more first network communications further immediately invalidate, at the at least one vehicle, one or more portions of the HD map that correspond to the location.

8. The at least one processor of claim 1, wherein the fused HD map representation correspond to at least one of the first layer or the second layer.

9. The at least one processor of claim 1, wherein the at least one indication triggers execution of a map update workflow including the generation of the mapstream data, generation of the updated version of the HD map, and the one or more vehicles switching to the updated version of the HD map.

10. The at least one processor of claim 1, wherein the processor is comprised in at least one of:
  a control system for an autonomous or semi-autonomous machine;
  a perception system for an autonomous or semi-autonomous machine;
  a system for performing simulation or digital twin operations;
  a system for performing collaborative content creation;
  a system for performing deep learning operations;
  a system implemented using an edge device;
  a system implemented using a robot;
  a system for generating synthetic data;
  a system incorporating one or more virtual machines (VMs);
  a system implemented at least partially in a data center; or
  a system implemented at least partially using cloud computing resources.

11. A system comprising:
one or more processing units comprising processing circuitry to:
  determine, for a portion of an HD map and based at least on one or more trips of one or more vehicles, one or more misalignments associated with a plurality of map layers of the portion in a version of the HD map;
  based at least on the one or more misalignments, transmit, over one or more first network communications to at least one vehicle, at least one indication that triggers the at least one vehicle of the one or more vehicles to generate mapstream data comprising at least one of sensor data, perception data, or relative trajectory data corresponding to the portion of the HD map and the plurality of map layers of the HD map;

convert, by at least one processor, the mapstream data into at least one map comprising at least one drive segment corresponding to the portion;

generate, by the at least one processor and using the at least one drive segment, a fused HD map representation of the drive segment; and transmit, over one or more second network communications to one or more vehicles, the fused HD map representation, the one or more second network communications causing the one or more vehicles to use the fused HD map representation of the drive segment in an updated version of the HD map to navigate an environment corresponding to the portion of the HD map.

12. The system of claim 11, wherein the portion of the HD map corresponds to a road segment, and the plurality of map layers correspond to the road segment.

13. The system of claim 11, wherein the processing circuitry is further to transmit the updated portion of the HD map to the one or more vehicles in a flatbuffer format.

14. The system of claim 11, wherein the processing circuitry is further to cause the one or more map layers to be deactivated for a first local copy of the HD map on a first vehicle based at least on the one or more misalignments while the one or more maps layers remain active for a second local copy of the HD map on a second vehicle.

15. The system of claim 11, wherein the update of the one or more map layers is based at least on one or more first weights indicative of a first safety impact of the one or more misalignments with respect to one or more first map layers of the plurality of map layers and one or more second weights indicative of a second safety impact of the one or more misalignments with respect to one or more second map layers of the plurality of map layers.

16. The system of claim 11, wherein the system is comprised in at least one of:

a control system for an autonomous or semi-autonomous machine;

a perception system for an autonomous or semi-autonomous machine;

a system for performing simulation or digital twin operations;

a system for collaborative content creation;

a system for performing deep learning operations;

a system implemented using an edge device;

a system implemented using a robot;

a system for generating synthetic data;

a system incorporating one or more virtual machines (VMs);

a system implemented at least partially in a data center; or a system implemented at least partially using cloud computing resources.

17. A method comprising:

based at least on an ego-machine determining one or more misalignments between a plurality of layers of a portion of a local version of an HD map, generating at least one indication of the one or more misalignments corresponding to the portion of the HD map;

sending, over one or more first network communications, the at least one indication to a remote server to trigger:

the remote server to:

generate, using at least one vehicle, mapstream data corresponding to the portion of the HD map;

convert, by at least one processor, the mapstream data into at least one map comprising at least one drive segment corresponding to the portion;

generate, by the at least one processor and using the at least one drive segment, a fused HD map representation of the drive segment; and transmit, over one or more second network communications to one or more vehicles, the fused HD map representation, the one or more second network communications causing the one or more vehicles to use the fused HD map representation of the drive segment in an updated version of the HD map to navigate an environment corresponding to the portion of the HD map.

18. The method of claim 17, wherein the mapstream data includes at least one of raw sensor data, pre-processed sensor data, perception data generated using one or more deep neural networks (DNNs), or data representative of a relative trajectory.

19. The method of claim 17, wherein the portion of the HD map corresponds to a road segment of the HD map, and at least one indication corresponds to the road segment.

* * * * *